United States Patent
Kniazev et al.

(10) Patent No.: US 9,958,840 B2
(45) Date of Patent: May 1, 2018

(54) SYSTEM AND METHOD FOR CONTROLLING SYSTEM USING A CONTROL SIGNAL FOR TRANSITIONING A STATE OF THE SYSTEM FROM A CURRENT STATE TO A NEXT STATE USING DIFFERENT INSTANCES OF DATA WITH DIFFERENT PRECISIONS

(71) Applicant: Mitsubishi Electric Research Laboratories, Inc., Cambridge, MA (US)

(72) Inventors: Andrei Kniazev, Cambridge, MA (US); Peizhen Zhu, Rolla, MO (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 422 days.

(21) Appl. No.: 14/631,159

(22) Filed: Feb. 25, 2015

(65) Prior Publication Data
US 2016/0246266 A1    Aug. 25, 2016

(51) Int. Cl.
*G05B 11/01* (2006.01)
*G05B 13/04* (2006.01)
(Continued)

(52) U.S. Cl.
CPC ......... *G05B 13/048* (2013.01); *H04N 19/124* (2014.11); *H04N 19/132* (2014.11); *G06F 9/30014* (2013.01); *G06F 9/30025* (2013.01)

(58) Field of Classification Search
CPC .......... H04N 19/124; H04N 19/132; G06F 9/30014; G06F 9/30025; G05B 13/048
See application file for complete search history.

(56) References Cited

U.S. PATENT DOCUMENTS 9,460,395 B2 * 10/2016 Baker .................. G06N 5/045
2003/0204809 A1 * 10/2003 Potkonjak ......... H03M 13/4169
                                                                714/795
(Continued)

FOREIGN PATENT DOCUMENTS

WO    20130136090 A1    9/2013

OTHER PUBLICATIONS

Bemporad et al. "The explicit linear quadratic regulator for constrained systems." Automatica (Journal of IFAC) vol. 38 Issue 1, Jan. 2002 pp. 3-20 Pergamon Press, Inc. Tarrytown, NY, USA.
(Continued)

*Primary Examiner* — Thomas Lee
*Assistant Examiner* — Zhipeng Wang
(74) *Attorney, Agent, or Firm* — Gene Vinokur; James McAleenan; Hironori Tsukamoto

(57) ABSTRACT

A controller for controlling a system includes a non-transitory computer-readable memory storing data for an operation and a control of the system and at least one processor operatively connected to the memory for determining a control signal transitioning a state of the system from a current state to a next state. At least two instances of the data are stored in the memory with different precisions defined by numbers of bits storing the instance in the memory. The processor determines the control signal using the instances of the data with the different precisions.

21 Claims, 18 Drawing Sheets

(51) Int. Cl.
*H04N 19/124* (2014.01)
*H04N 19/132* (2014.01)
*G06F 9/30* (2018.01)

(56) References Cited

U.S. PATENT DOCUMENTS

| | | | | |
|---|---|---|---|---|
| 2006/0259197 | A1* | 11/2006 | Boe | G05B 13/027 |
| | | | | 700/246 |
| 2009/0043546 | A1* | 2/2009 | Srinivasan | G05B 13/04 |
| | | | | 703/2 |
| 2015/0066337 | A1* | 3/2015 | Langley | G05B 13/048 |
| | | | | 701/104 |
| 2016/0057418 | A1* | 2/2016 | Lei | H04N 19/124 |
| | | | | 375/240.03 |

OTHER PUBLICATIONS

Wills et al. "Fast Linear Model Predictive Control via Custom Integrated Circuit Architecture." IEEE Transactions on Control Systems Technology, vol. 20, No. 1, pp. 51-71. Jan. 2012.

* cited by examiner

SYSTEM AND METHOD FOR CONTROLLING SYSTEM USING A CONTROL SIGNAL FOR TRANSITIONING A STATE OF THE SYSTEM FROM A CURRENT STATE TO A NEXT STATE USING DIFFERENT INSTANCES OF DATA WITH DIFFERENT PRECISIONS

FIELD OF THE INVENTION

This invention relates generally to controlling an operation of a system, and more particularly to controlling the operation using data stored in a memory of a controller.

BACKGROUND OF THE INVENTION

A controller is a device, or set of devices, that manages, commands, directs or regulates the behavior of other devices or systems. Typically, a controller stores data indicative of the operation of the controlled system and use such data for the controlling.

Many advanced control techniques are formulated as optimization problems, which can be solved by programming. For example, one class of such techniques is optimization-based receding time horizon control, such as model predictive control (MPC). There are MPC formulations for both linear and non-linear systems. Non-linear MPC solves non-linear programs in real-time, which can be a challenging task due to limited computing resources, the complexity of the problem to solve, or the time available to solve the problem. Therefore, most of the practical applications are based on a linearity assumption or approximation. The linear MPC typically solves a quadratic programming problem, i.e. the problem of optimizing (minimizing or maximizing) a quadratic function of several variables subject to linear constraints on these variables.

When compared to other control strategies, the MPC has the advantage of explicitly accounting for constraints and the ability to handle multiple inputs and outputs. However, the MPC is computationally complex because it requires an optimization problem to be solved at each time step in order to calculate the control output of the controller to be used as a control input of the system.

An explicit MPC (EMPC) is formulated as a way of dealing with these limitations. In EMPC, the optimization part of the problem is solved off-line, prior to implementing the controller. In particular, for linear systems subject to linear constraints and cost function based on one-norm, infinity-norm, or squared two-norm, EMPC results in a polyhedral piecewise affine (PWA) feedback law. Thus, during the on-line execution, the EMPC controller first identifies which polyhedral region contains the current state, and then computes the control action by evaluating the corresponding affine control law. In other words, the solution to the off-line part of the algorithm is represented as a set of adjacent, convex regions in an n-dimensional state space. The real-time part of the control process searches the state space to determine which region the system is currently operating in. The identification of the polyhedral region is referred to as the point location problem. Each region is associated with a set of coefficients used to easily calculate the control; see, e.g., WO2013/136090.

The reduction of the precision of the data used by the controller to control the system decreases the number of bits stored by the controller and increases the speed of the control. However, such a reduction reduces the accuracy of the on-line execution of the controller. For example, if the selected precision is too small, then the accuracy of the controller can get below the required level of accuracy.

The state-of-the-art method for determining the number of bits on the memory of the controller is a subjective decision based on an ad hoc educated guess of the engineer designing the controller for the given system. Such a subjective decision does not usually guarantee a specific level of accuracy of the control.

SUMMARY OF THE INVENTION

Some embodiments of the invention are based on the recognition that a precision of an arithmetic used in on-line execution of the controller affects the performance of the controller. For example, the control of the system can include on-line and off-line computations. During the off-line computation, the data for controlling the system are determined. For example, the data can include a model of the controlled system or other control parameters. During the on-line execution of the control, the controller controls the system using the previously determined data.

The off-line computation is usually performed with a high precision, referred herein as a true precision, and the data determined with the true precision are referred herein as the true data. Nowadays, the true precision is usually determined with the floating point double precision computer arithmetic. For on-line execution, the data have to be stored in the hardware of the controller with potentially low available memory having small numbers of bits for every number stored and processed. This reduction of precision, compared to the true precision, is called "quantization", and the reduced precision data are "quantized" data. A method of the quantization can be determined, for example, using rounding.

The quantization decreases the number of bits stored by the controller and increases the speed of determining the control. However, the quantization also reduces the accuracy of the on-line execution of the controller as compared with the accuracy of the controller operations with the true precision. For example, if the selected precision is too small, then the accuracy of the controller can drop below the required accuracy threshold, leading to system malfunctions or even failures.

For example, for an explicit model predictive control (EMPC), the off-line computation includes solving an optimization problem for controlling a system. During the on-line execution, the EMPC controller first identifies which polyhedral region includes a current state of the system, and then computes the control action by evaluating the corresponding affine control law. If the selected precision is too small in the EMPC controller, then the EMPC controller can fail to accurately determine the region for the current state of the controlled system, and, thus can fail to determine the true control for the given current state.

A state-of-the-art method for determining the precision of the operations in the controller uses a subjective decision based on an ad hoc educated guess of an engineer designing the controller for the given system. Such a subjective decision does not usually guarantee a specific level of accuracy of the control. The validity of the quantized data, representing the system in the controller is typically checked numerically versus the true data on randomly selected state vectors. The state space in true precision includes so many state vectors that an exhaustive validation is impractical even off-line. A possible inaccurate on-line computation of the control can result not only in suboptimal control, but also in system malfunctions and failures.

It is therefore desired to reduce the precision of the quantized data for on-line execution of the controller, such that the quantized control with quantized data deviates from the true control with true data within predetermined bounds, wherein a precision of the data is defined by a number of bits storing the data in the memory. It is beneficial to have the data stored in the memory with different precisions, wherein the data larger affecting the accuracy of the controller are stored with a greater precision, compared to the data less affecting the accuracy of the controller.

Some embodiments determine the target accuracy of the controller based on an accuracy of a sensor for sensing, or an estimator for estimating, the current state of the system. This is beneficial because the excessive target accuracy can make controller design more difficult and unnecessary increase the costs of the controller hardware needed to control rapidly changing systems.

Various embodiments of the invention are based on a realization that a state of the controlled system determined with quantized data deviates from the state of the controlled system determined with the true data within predetermined limits depending on a control method, data representing the system, and the precisions of the quantization. Thus, for any reduction of the precision of the quantized data, it is possible to determine off-line a maximal deviation of the state of the controlled system caused by that reduction.

In addition, the maximal deviation of the state of the controlled system caused by that reduction of the precision of on-line execution governs the maximal reduction of the accuracy of the control with quantized data with respect to the accuracy of the control with true data. For example, a ratio of the accuracy of control with quantized data and the maximal deviation of the state is bounded by a constant that can be determined off-line based on the specifics of the state regions for the controlled system in EMPC.

Some embodiments determine off-line a mapping between various precisions of the quantized data and corresponding reductions of the accuracy of the control from the true accuracy of the control with the true data. Therefore, different reductions in the precision, compared to the true precision, can be tested, and the maximal reduction satisfying the accuracy requirement of the control can be selected.

For example, some embodiments employed by the EMPC controller determine the small precision of the data representing the facet that separates the two regions with gains, which are either small or nearly equal to each other. This is advantageous because, even if the state jumps across the facet from a correct region to a wrong region due to quantization of the system and the facet, there is a small loss of accuracy of the control due to using a gain from a wrong region. Those embodiments are based on a realization that the control error is the largest when the original state and the quantized state belong to different regions, which can happen if a distance from the state vector to the facet separating the two regions is smaller than a threshold.

Some embodiments analyze off-line every facet in EMPC, which needs to be stored in controller memory for the given system in the quantized format, and determining how many bits are needed in order to obtain the control with a given level of accuracy. Finding the worst-case scenario, i.e., the largest number of bits over all facets, determines the number of bits needed to quantize the data on the controller. This embodiment is advantageous, because the method, which is fully automatic with no tuning parameters, determines the number of bits needed for data quantization on the processor in order to obtain the control with a given level of accuracy, taking away the guessing of the prior art.

Other embodiments are based on a realization that different facets can require different number of bits in their quantized format to represent the same level of accuracy in the control, wherein some facets can require a smaller number of bits compared to the worst case. For example, if a facet requires only half bits of the controller number representation, this is advantageous, because it allows to store the data for this facet in half-precision, reducing the memory usage, and, alternatively or additionally, to perform the checking, on which side of the facet the state is, also in half-precision. Half-precision calculations can be implemented to decrease processing time by half, compared to the normal clock rate of the controller processor, speeding up the most computationally complex part of the EMPC controller operation, and thus improving a performance and a speed of the controller.

Some embodiment are based on a realization that the state vector for many practical systems does not necessarily fill the whole state space, instead following some trajectories, which occupy only a small subset of the state space. A prior knowledge of the subset of the state space, possibly containing the state vector, or a probability distribution of the state vector randomly distributed over the state space, allows to store with high precision only the data related to the subset of the state space, where the state vector is more likely to appear.

In other embodiments, the controller processor determines and updates different precisions of the data during an operation of the system, for example, using learning of possible positions the state vector in the state space to determine the subset of the state space, possibly containing the state vector, or the probability distribution of the state vector randomly distributed over the state space.

Accordingly, one embodiment discloses a controller for controlling a system including a non-transitory computer-readable memory storing data for an operation and a control of the system, wherein at least two instances of the data are stored in the memory with different precisions, wherein the precision of the instance is defined by a number of bits storing the instance in the memory; and at least one processor operatively connected to the memory for determining, in response to receiving a current state of the system, a control signal transitioning a state of the system from the current state to a next state using the instances of the data with the different precisions.

Another embodiment discloses a method for controlling a system. The method includes determining, in response to receiving a current state of the system, a control signal transitioning a state of the system from the current state to a next state using the data representing an operation and a control of the system, wherein at least two instances of the data are quantized with different precisions, wherein the precision of the instance is defined by a number of bits required to store the instance in a memory; and controlling the system using the control signal. The steps of the method are performed by at least one processor of a controller.

Yet another embodiment discloses a method for controlling a system using a controller determining a control signal transitioning a state of the system from a current state to a next state. The method includes determining, using data representing an operation and a control of the system, a function bounding an accuracy of the controller for different precisions of instances of the data, wherein the accuracy of the controller is an inverse of a deviation of a true control determined with true data having a true precision from a control determined with the data having a precision lower than the true precision, and wherein the precision of the instance is defined by a number of bits required to store the instance in a memory; selecting, using the function, a precision for different instances of the data, such that the selected precision results in at least a target accuracy of controller controlling the system with the different instances of the data; and storing the data quantized with the selected precision in a memory of the controller. The steps of the method are performed by at least one processor.

DETAILED DESCRIPTION OF THE PREFERRED EMBODIMENT

Figure 1A:
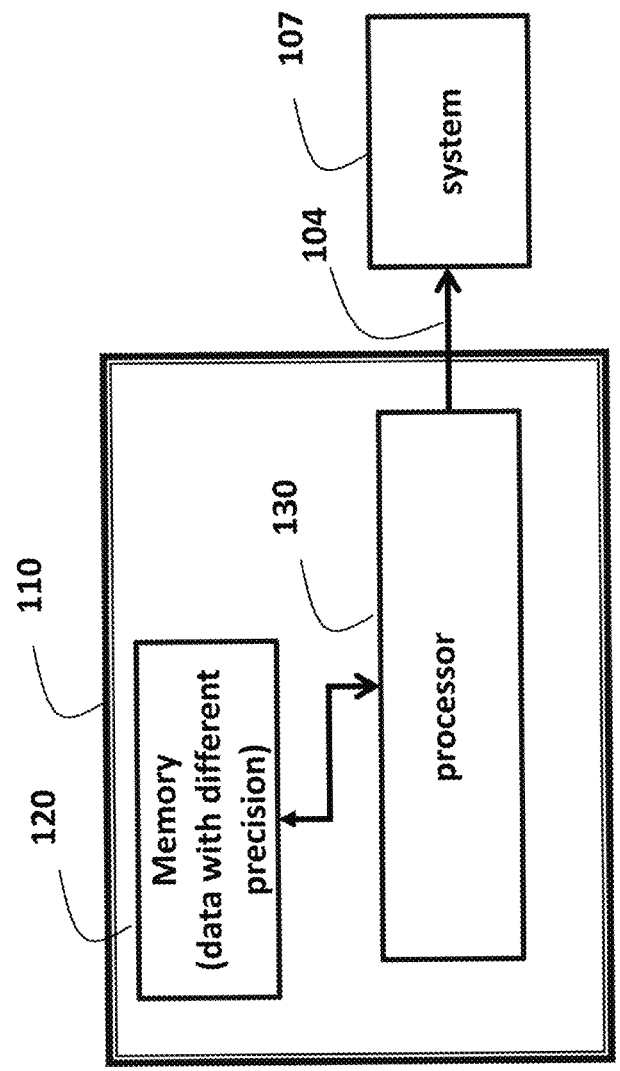
FIG. 1A is a block diagram of a controller for controlling a system according to embodiments of the invention.

FIG. 1A shows a block diagram of a controller 110 for controlling a system 107 according to some embodiments of the invention. The controller includes at least one processor 130 for executing modules of the controller. The processor 130 is operatively connected to a non-transitory computer-readable memory 120 storing data for an operation and a control of the system. It is an objective of some embodiments of the invention to determine the control signal 104 transitioning a state of the system from a current state to a next state.

In some embodiments of the invention, at least two instances of the data are stored in the memory 120 with different precisions, wherein a precision of an instance is defined by a number of bits storing the instance in the memory, such that the processor 130 determines the control 140 using the instances of the data with the different precisions.

Figure 1B:
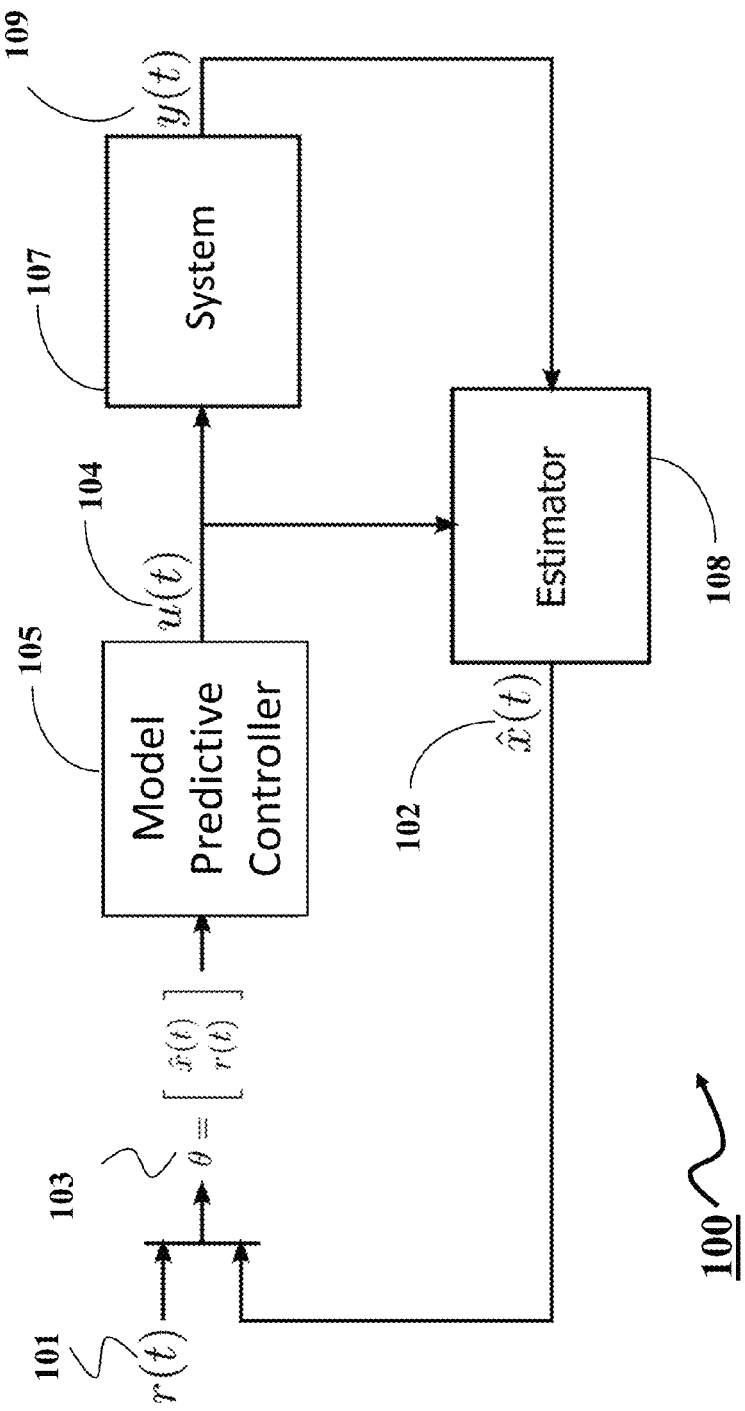
FIG. 1B is a block diagram of a control system using a model predictive control (MPC) according to some embodiments of the invention.

FIG. 1B shows a block diagram of the control system 100 according to embodiments employing a model predictive control (MPC) for controlling the system 107. MPC is a control algorithm that reads the state or state estimate of a dynamical system and solves a finite horizon optimal control problem formulated over a future horizon from the system dynamics, system constraints, and objective cost function. Of the optimal sequence of control inputs 140 to the system 107 over the future horizon, the first component is applied to the system 170, and a new optimal control problem is solved in the processor 130 over a shifted future horizon when the next state is read.

The control system 100 includes a model predictive controller 105, representing the controller 110 using MPC, and a state estimator 108 to control a system 107. The controller 105 includes a processor 130 and the memory 120 storing data with different precisions. During the operation, the controller 105 receives a reference signal r(t) 101 indicating the reference operation of the system as a function of time t. The reference signal can be, for example, a motion or a position command, or represent the desired value of some parameter in the system. In response to receiving the reference signal r(t) 101, the controller 105 generates a control signal u(t) 104 for the system 107. In response to the input 104, the system 107 updates the output y(t) 106, and the estimator 108 estimates the state $\hat{x}(t)$ 102 of the system.

The system 107 can be any device that is controlled by manipulating control input signals 104, possibly associated with physical quantities such as voltages, pressures, forces, and returns system output 109 possibly associated with physical quantities such as currents, flows, velocities, and positions. The values of the output signal 109 are related in part to previous system output values, and in part to previous and current input values 104. The dependency of previous inputs and previous outputs can be encoded in the state 102. The operation of the system 107, e.g., a motion of the system, can include a sequence of output values generated by the system following the application of certain input values. The system 107 can include actuators, for modifying a system behavior according to the control signal 104, and sensors, which measure the system behavior producing an output signal y(t) 109. The estimator 108 uses the system output y(t) 109 along with the current and past values of the control signal u(t) 104 to estimate the current state 102 of the system 170.

The controller 110 can be implemented in hardware or as a software program executed in a processor 130, e.g., a microprocessor, which at fixed or variable sampling intervals receives the system outputs and the reference operation of the system, and determines, using this information, the control inputs 104 for operating the system. The processor 130 is suitably programmed to perform the steps of the methods according to various embodiments, using the data with the different precisions stored in the memory 120.

The reference signal r(t) 101 can be combined with the estimated system state x̂(t) 102 of the system to form the (augmented) state vector θ 103. The state vector θ 103 contains the system state 102 and possibly other quantities, for example, one or a combination of a reference signal r 101 and values of the previous control signals, such as $u^{(-1)}$, $u^{(-2)}$, . . . . The model predictive controller 105 determines the control signal u(t) 104, based on the value of the state vector θ 103.

In some systems, the system state 102 is completely determined by the system 107 outputs y(t) 109, in which case the estimator 108 can form the state estimate directly as $$\hat{x}(t)=My(t),$$

where M is an appropriate square matrix of full rank. For example, if x̂(t)=y(t), the estimator 108 may not be needed. However, there are situations when some or all of the system state variables are unobservable by sensors, in which case the state estimate can be formulated in a number of different ways. For example, for a linear system $$x(t+1)=Ax(t)+Bu(t)$$

$$y(t)=Cx(t)+Du(t),$$

where A, B, C, D are matrices of appropriate size, an estimator 108 can be made according to the following formulas $$z(t+1)=Az(t)+Bu(t)-L(y(t)-Cz(t)-Du(t))$$

$$\hat{x}(t)=C_z z(t)+C_u u(t)+C_y y(t),$$

where L, $C_z$, $C_u$, $C_y$ are appropriately constructed matrices.

Solving the optimal control problem, e.g., the MPC problem, at every control cycle can require a significant amount of computation and hence can be too slow to be executed in controllers having limited computational capabilities, or in fast systems where the control is required to be applied often, e.g., every few microseconds. A possible alternative is an explicit MPC (EMPC), explicitly computing the solution of the MPC optimal control problem as a function of the state, also called the parametric solution of the MPC problem. For linear systems subject to linear constraints and cost function based on one-norm, infinity-norm, or squared two-norm, the explicit solution of the MPC is a polyhedral piecewise affine (PWA) function $$u = \begin{cases} C_1\theta + E_1 & \text{if } \theta \text{ is in region } P_1 \\ \vdots \\ C_N\theta + E_N & \text{if } \theta \text{ is in region } P_N \end{cases},$$

wherein a state space 200, i.e. the set of all possible values of the state vector θ 103 is represented as a union of nonintersecting convex polygonal or polyhedral regions $P_1$, . . . , $P_N$. Every convex polygonal or polyhedral region with an index i, denoted by $P_i$, is determined by a set of $M_i$ linear inequalities, e.g., $$\theta \text{ is in region } P_i \text{ if } \begin{cases} H_{i,1}\theta \leq k_{i,1} \\ \vdots \\ H_{i,M_i}\theta \leq k_{i,M_i} \end{cases},$$

wherein H with various indexes are row-vectors, Hθ denotes a matrix product of the row-vector H and the state column-vector θ 103, and k with various indexes are scalars.

In some embodiments of the invention, the controller 110 is an EMPC controller. In EMPC, the optimization part of the problem is solved off-line, prior to implementing the controller by computing the parametric solution of the MPC problem. Thus, during the on-line execution, the EMPC controller 105 first identifies which polyhedral region contains the current state 103, and then computes the control action by evaluating the corresponding affine control law. The solution to the off-line part of the algorithm is represented as a set of adjacent convex regions in a multi-dimensional state space. During the real-time phase of the control process, the EMPC controller searches the state space to determine which region the system is currently operating in. The identification of the polyhedral region is referred to as the point location problem. Each region is associated with a set of coefficients used to calculate the control output 104 of the controller 105 to be used as a control input of the system 107.

The EMPC reduces the amount of real-time computation required to implement an MPC controller by shifting part of the computation off-line. However, the real-time phase of the EMPC execution can still require many thousands of operations for searching the state space, which makes explicit model predictive controllers implemented using general purpose computing units and circuitry too slow for some real-time control applications for fast systems, especially when the MPC optimal control problem has many decision variables and/or constraints.

Application-specific circuits are customized for a particular use, rather than intended for a general-purpose use. It is challenging to optimize the design of the application-specific circuits for the specific problem. One of key design decisions, greatly affecting both the speed and the accuracy of the controller 110, is the precisions of arithmetic operations performed by the controller 110. Accordingly, there is a need to provide the application-specific circuit for the controller 110 controlling the system 107, and to decide on the choice of the precisions used to represent the data in the controller memory 120.

An application-specific integrated circuit (ASIC) is an integrated circuit (IC) customized for a particular use, rather than intended for a general-purpose use. For example, a chip designed to run in a digital voice recorder or a high efficiency Bitcoin miner is typically an ASIC. The data of EMPC controller are stored in the memory 120, e.g., an application-specific integrated circuit (ASIC) hardware memory, wherein every stored number in the data is represented using small numbers of bits. Thus, the data typically cannot be stored exactly, i.e., in the true precision of the true data, and hence a precision loss occurs. Such a reduction is referred herein as quantization and the reduced precision data are referred as quantized data, in contrast to the true data represented in the true precision.

Quantization decreases memory 120 requirements and increases the speed of the control evaluation by the controller 110, but also increases inaccuracy in the computation of the control input 104. For example, if the quantization precision is too small, then the EMPC controller 105 can fail to accurately determine the region for the current state 103 of the controlled system 107, and thus, the control 104.

Because every region in EMPC is convex, each region can be stored in the memory of ASIC EMPC controller in the form of facets of the region, because each region can be viewed as an intersection of half-spaces, represented by the facets. For example, if a first region of a state space and a second region of the state space share a border, defined by a common inequality, then there is no need to formulate different inequalities for the first and the second regions. The common inequality can be defined, e.g., only for the first region and the difference in the evaluation of the common inequality for the second region can be accounted in negation of the result of evaluation of the common inequality for the first region.

Figure 2:
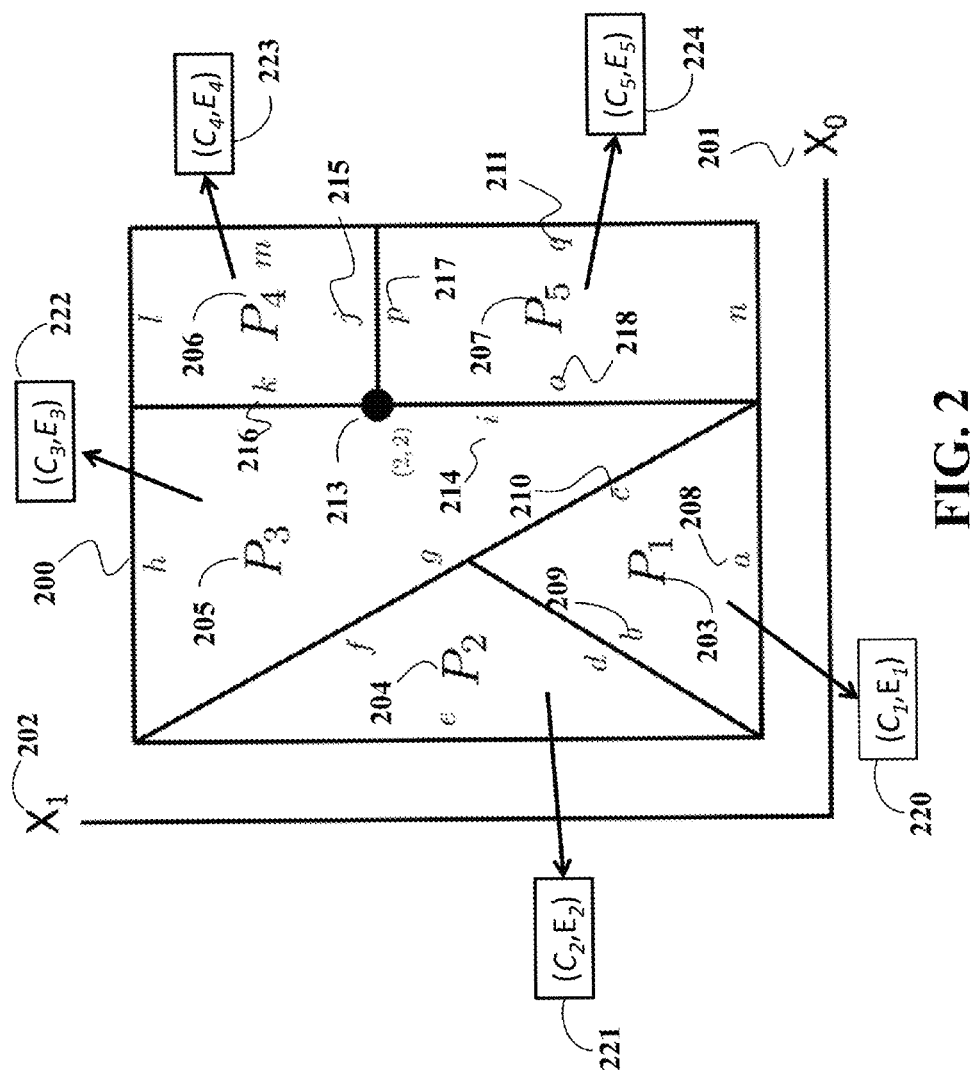
FIG. 2 is a diagram of an exemplar state space of the controlled system partitioned into polyhedral regions according to principles of the explicit MPC (EMPC) according to some embodiments of the invention.

FIG. 2 is a diagram of a fragment of a state space 200 of the controlled system 107 partitioned into polyhedral regions according to principles of the EMPC used by some embodiments. In this example, the state space is two dimensional with two states $X_0$ 201 and $X_1$ 202, and the state vector $\theta$ 103 thus has two components $[X_0\ X_1]$. Usually, however, the state space is n-dimensional, with n>2.

The state space 200 is partitioned in FIG. 2 into a polyhedral partition with five convex polyhedral regions $P_1$ 203, $P_2$ 204, $P_3$ 205, $P_4$ 206, and $P_5$ 207. Each controller region $P_i$ is determined by the following set of inequalities $$\begin{cases} H_{i,1}\theta \le k_{i,1} \\ \vdots \\ H_{i,Mi}\theta \le k_{i,Mi} \end{cases},$$

wherein every inequality defines the facet bounding the region. For example, the facet with the index j of the region $P_i$ determines a half-space given by the inequality $H_{i,j}\theta \le k_{i,j}$, wherein the state vector $\theta$ 103 is a column-vector, $H_{i,j}$ is a row-vector, and $k_{i,j}$ is a scalar.

The set of inequalities can be written in a matrix form as $$H_i\theta - k_i \le 0,$$

wherein i represents the region number, and $$H_i = \begin{bmatrix} H_{i,1} \\ \vdots \\ H_{i,Mi} \end{bmatrix}.$$

$$k_i = \begin{bmatrix} k_{i,1} \\ \vdots \\ k_{i,Mi} \end{bmatrix}.$$

Denoting by $T_i$ an auxiliary matrix defined for convenience as follows $$T_i = \begin{bmatrix} H_{i,1}, -k_{i,1} \\ \vdots \\ H_{i,Mi}, -k_{i,Mi} \end{bmatrix},$$

the entire system of inequalities for region $P_i$ in the matrix form turns into $$[T_i]\begin{bmatrix} \theta \\ 1 \end{bmatrix} \le 0.$$

In the diagram of FIG. 2, each lowercase letter represents an inequality and makes up a single row of the matrix $T_i$. For example, region $P_i$ is represented by three inequalities a 208, b 209, and c 210. The combined matrix representing the boundaries of $P_1$ is of the form $$T_1 = \begin{bmatrix} a \\ b \\ c \end{bmatrix}.$$

Instead of evaluating $H_i\theta - k_i \le 0$ for each region sequentially, taking all of the inequality matrices from each region and forming a new matrix D that contains all of the inequality coefficients as follows $$D \equiv \begin{bmatrix} H_1 & -k_1 \\ \vdots & \vdots \\ H_N & -k_N \end{bmatrix} = \begin{bmatrix} T_1 \\ \vdots \\ T_N \end{bmatrix},$$

where N is the total number of controller regions, allows compactly writing all the inequalities in the system as the following simple form $$D\begin{bmatrix} \theta \\ 1 \end{bmatrix} \le 0.$$

Since most of the facets bound multiple regions, many rows in the matrix D appear repeatedly. The redundant repetition can be eliminated from the matrix D off-line.

Each region $P_i$ is associated with a set of gains and offsets $(C_i, E_i)$ associated with it, such that region $P_1$ 203 is associated with $(C_1, E_1)$ 220, region $P_2$ 204 is associated with $(C_2, E_2)$, and so on. In general, $C_i$ is matrix and $E_i$ is a vector, which means that more than one memory address is required to store the gain coefficients for a single region. For example, in the EMPC for the state space 200 of FIG. 2, the matrix $C_i$ may have two elements and the vector $E_i$ may have one element. Therefore, each region requires three addresses to store the set of the gains and the offsets in the memory 120 of the controller 110, and the entire state space requires fifteen addresses. In some embodiments of the invention, the gains and the offsets are quantized and stored in the memory 120 of the controller 110 in a plurality of precisions, possibly also different from the precisions used to quantize and store in the memory 120 of the controller 110 elements of the matrix D and from the precisions used to quantize in the controller 110 the entries of the state vector $\theta$ 103.

Figure 3A:
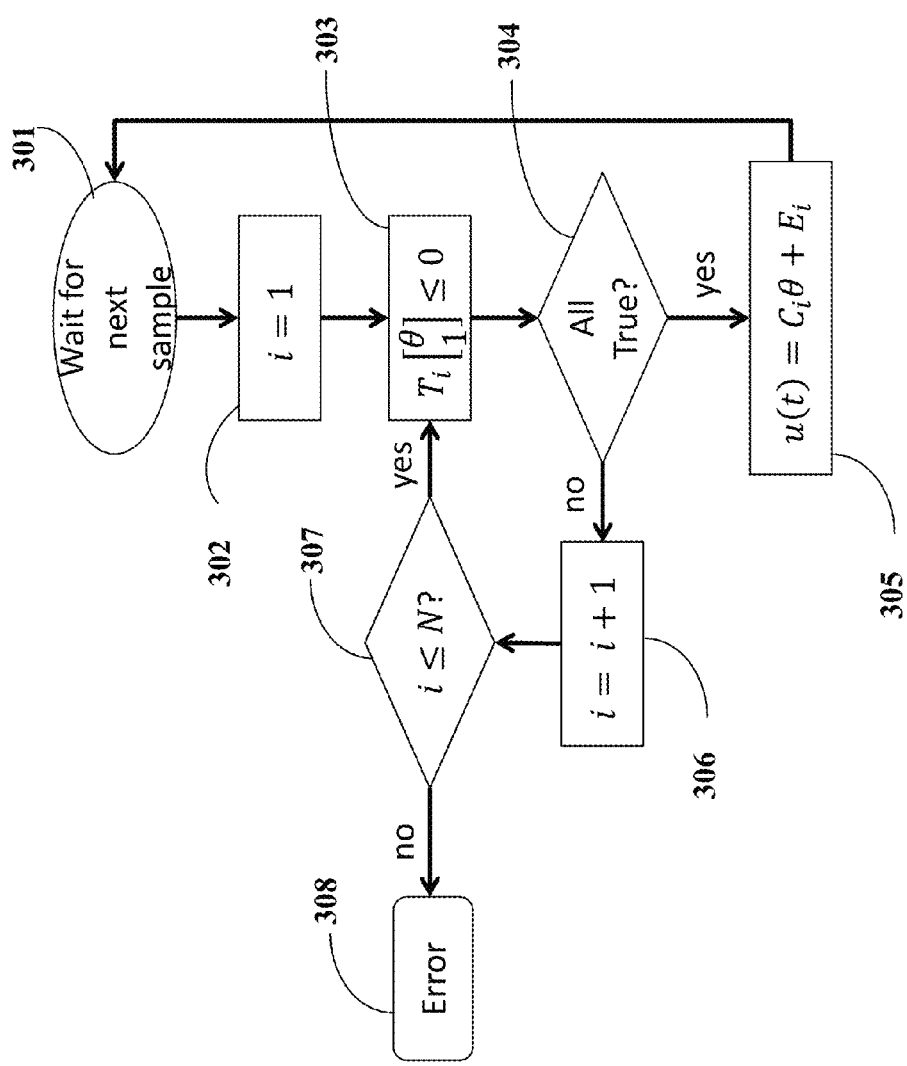
FIG. 3A is a block diagram of a method for controlling the system using the EMPC according to one embodiment of the invention.

FIG. 3A is a flow chart illustrating the operation of sequential software implementations of EMPC controllers 105 used by some embodiments of the invention. The EMPC controllers are designed for inherently discrete time, or sampled, systems. As such, the controller 105 waits for a new sample 301 to commence computation of the next control output of the controller. The index i, which indicates the region $P_i$ being evaluated, is initialized 302 to 1. Then, the product involving $T_i$ and the current state 103 is computed 303. The inequalities defining the boundaries of the region i are evaluated 304 with respect to the state of the system. If all inequalities hold, then the active region includes the current state 103 and the controller output 104 is calculated 305 using the gains and offsets $(C_i, E_i)$ for the region $P_i$, and the controller 105 waits for a new sample.

If at least one inequality is false, then the index i is incremented 306 by one and checked to make sure it is less than or equal to N 307, the total number of regions in the controller 105. The controller 105 continues evaluating the inequalities for each region sequentially until a region is found where all of the inequalities evaluate to true or all of the regions have been searched. When i exceeds N all of the regions have been searched without finding an active region. In this case some special error action 308 is taken. The error action could include reprocessing the previous control output of the controller, reverting to some default gains $C_d$ and $E_d$ for the controller output computation, or some other action that meets the requirements of the system.

Figure 3B:
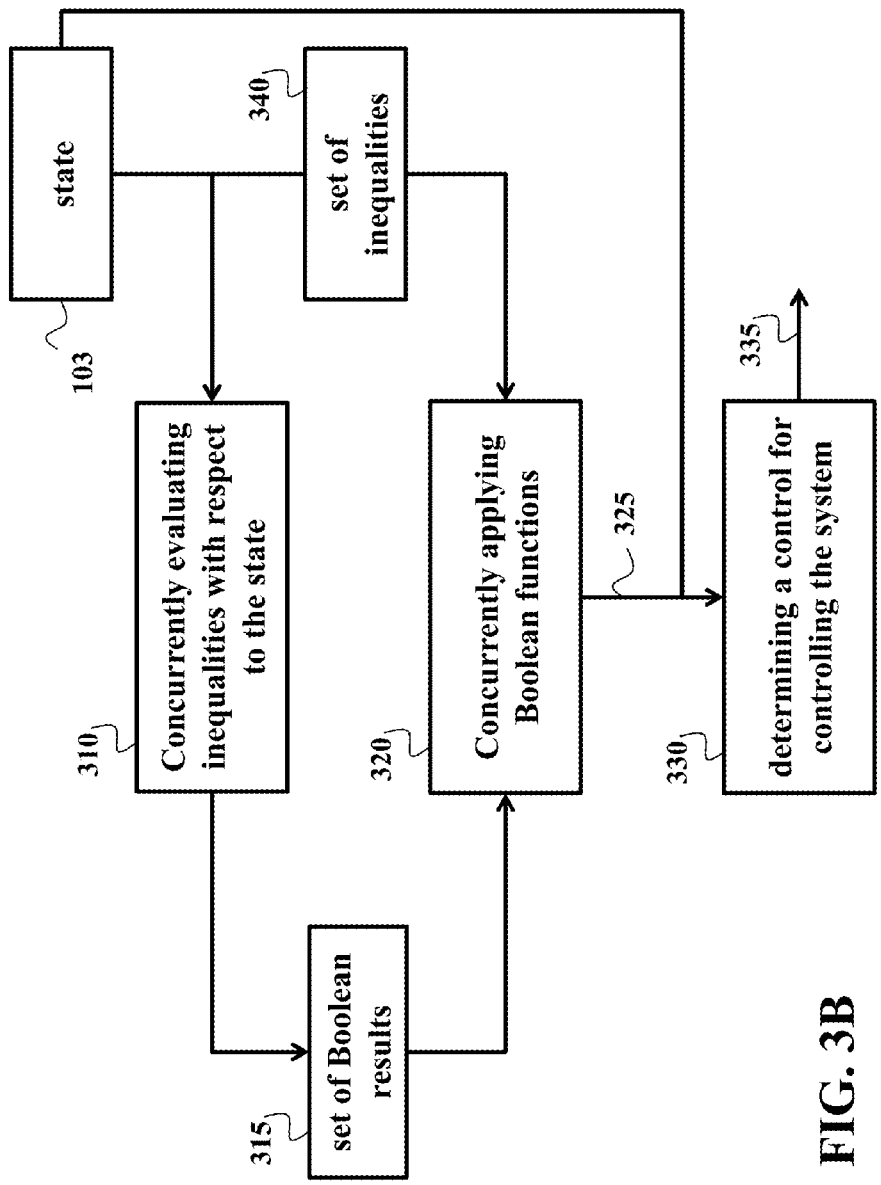
FIG. 3B is a block diagram of a method for controlling the system using the EMPC according to another embodiment of the invention.

FIG. 3B shows a block diagram of a method for controlling a system using EMPC with some parallel implementation. The method evaluates 310, with respect to a state 103 of the system, each inequality in a set of inequalities 345 to produce a set of Boolean results 315. The inequality in the set of inequalities 345 defines a set of regions of a state space of the system, as shown in an example of FIG. 2. In contrast to the sequential evaluation of the inequalities for different regions, at least some or all inequalities from the set are evaluated concurrently to produce the set of Boolean results 315, wherein a size of the set of Boolean results equals a size of the set of the inequalities.

For example, each inequality $H_{i,j}\theta \leq k_{i,j}$ can be checked by calculating the matrix product $H_{i,j}\theta$ that is equal to the scalar product, also known as the dot "·" product, $H_{i,j}\theta = (H_{i,j})^T \cdot \theta$ of the coefficients $H_{i,j}$ and the state $\theta$ 103. The scalar product of two vectors a and b is calculated by multiplying corresponding elements of the vectors a and b together and then summing the products, as in the formula $$a \cdot b = \Sigma_{i=1}^{n} a_i b_i.$$

This formula describes a Multiply ACcumulate (MAC) operation, which is one of the fundamental building blocks of many digital signal processers (DSP). Because of its fundamental nature, there are different high performance circuit implementations of the MAC operation. Hardware accelerated MAC blocks are included in field programmable gate arrays (FPGAs), such as the DSP48 block present in many Xilinx® FPGAs, and MAC libraries available for many ASICs vendors.

Figure 4:
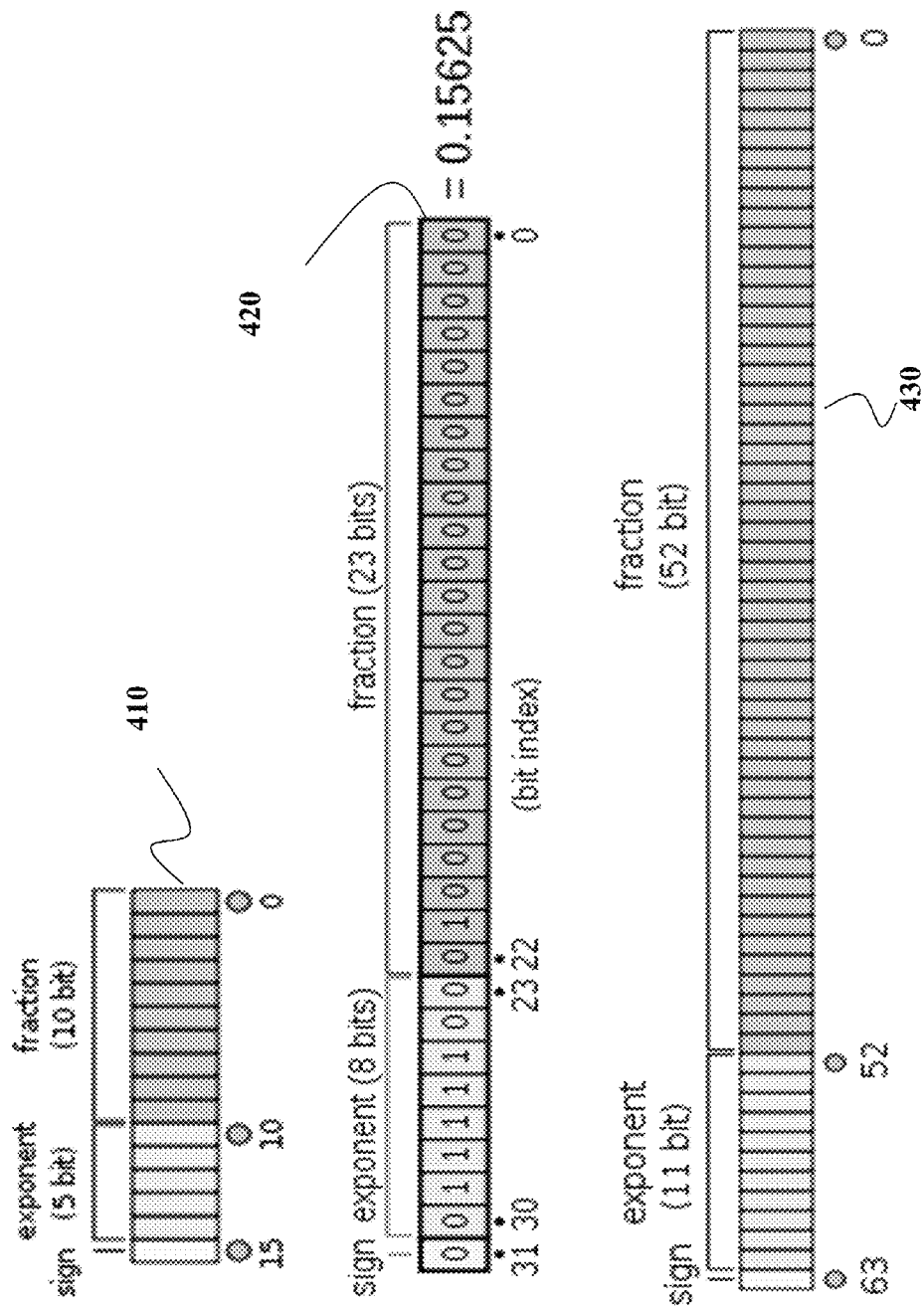
FIG. 4 is a schematic of various formats for number representations used by some embodiments of the invention.

Various embodiments of the invention are based on recognizing that the precisions of the arithmetic used in on-line execution of the controllers affects the performance and accuracy. FIG. 4 illustrates various formats for the different precisions of the instances of the data according to some embodiments of the invention. Such examples of the precisions are described in the 754 IEEE Standard for the Floating-Point Arithmetic.

The off-line computation in EMPC is usually performed with the high precision, referred herein as a true precision, and the data determined with the true precision are referred herein as the true data. Nowadays, the true precision is usually a floating point double precision 430, also called binary64, computer arithmetic, as described by the 754 IEEE Standard for the Floating-Point Arithmetic.

For on-line execution, the data have to be stored in the memory 120 of the controller 110 with potentially low available memory having reduced, compared to the true precision, numbers of bits for every number stored and processed. For example, according to some embodiments of the invention, at least two instances of the data are stored in the memory with different precisions using, e.g., a floating point single precision 410, also called binary32, or half precision 420, also called binary16. In some embodiments, at least some instances of data can be stored with double precision 430.

In some embodiments, the controller hardware can use a fixed-point number representation, which is a real data type for a number that has a fixed number of digits after (and sometimes also before) the radix point (after the decimal point '.' in English decimal notation). The fixed-point arithmetic is used when the executing processor has no floating point unit (FPU) or if fixed-point provides improved performance. Most low-cost embedded microprocessors and microcontrollers do not have an FPU. In some embodiments, at least some instances of data can be stored with the fixed-point precision.

The reduction of the precision from the true precision to the reduced precision is called the "quantization," and the reduced precision data are the "quantized" data. The quantization procedure can be determined, for example, using rounding. The quantization decreases the number of bits that need to be stored in the memory 120 of the controller 110 and increases the speed of the controller 110, which is advantageous to control on-line quickly changing systems. However, the quantization also reduces the accuracy of the on-line execution of the EMPC controller as compared with the accuracy of the controller operations with the true precision. For example, if the selected precision is too small, the controller can fail to accurately determine the region for the current state of the controlled system, and, thus can fail to determine the true control for the given state. Accordingly, some embodiments reduce the precision of the quantized data for on-line execution of the EMPC controllers, such that the quantized control with quantized data deviates from the true control with true data within predetermined bounds.

Additionally, or alternatively, the precision of the quantized data can be determined based on keeping within predetermined bounds an accuracy of the state at the next time point, wherein the accuracy of the state at the next time point is determined using a deviation of the state at the next time point computed using the quantized control with quantized data from the state at the next time point computed using the true control with true data.

Various embodiments of the invention are based on a realization that a future state of the controlled system determined by a controller with quantized data deviates from the future state of the controlled system determined by a controller with the true data within predetermined limits depending on the precision of the quantized data. Thus, for any reduction of the precision of the quantized data it is possible to determine off-line a maximal deviation of the state of the controlled system caused by that reduction.

Figure 5:
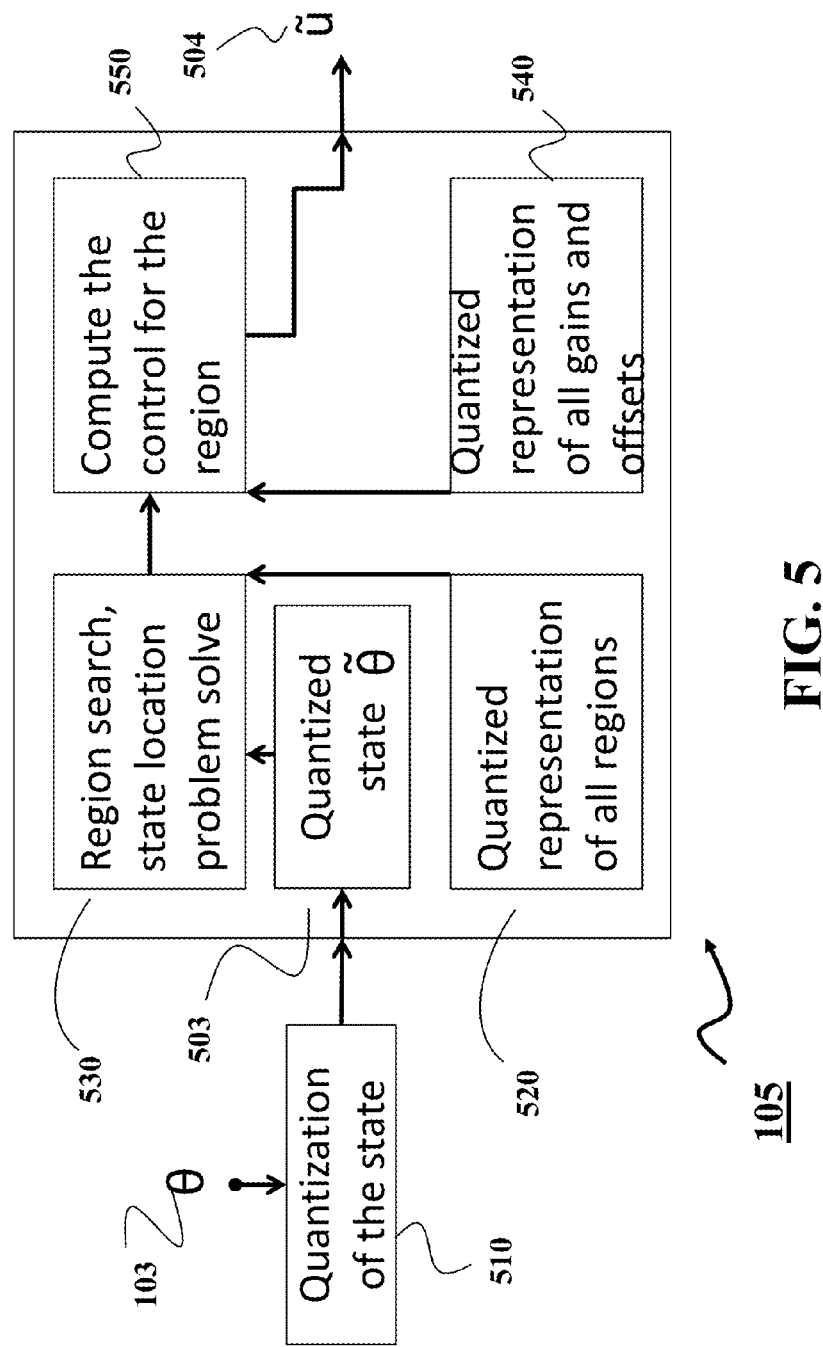
FIG. 5 is a flow chart of a quantized EMPC method according to some embodiments of the invention.

FIG. 5 shows a flow chart of a quantized EMPC method according to some embodiments of the invention based on a realization that a representation of a true state of the controlled system, at the present time step, 103 deviates from a representation of a quantized state 503 of the controlled system, at the present time step, due to the quantization 510 of the state, wherein the deviation is within predetermined limits depending on the precision of the quantized data.

Another embodiment of the invention is based on a realization that data representing the regions of EMPC of the controlled system determined with quantized data 520 deviate from data representing the regions of EMPC of the controlled system determined with the true data within predetermined limits depending on the precision of the quantized data.

Additionally or alternatively, some embodiments of the invention are based on another realization that data representing gains and offsets for all regions of EMPC of the controlled system determined with quantized data 540 deviate from data representing the gains and offsets for all regions of EMPC of the controlled system determined with the true data within predetermined limits depending on the precision of the quantized data. Quantization thus affects the region search, also called the state location problem solve, 530, as well as the computation 550 of the control, both resulting in a control u 504 that deviates from the true control 104

$$u = \begin{cases} C_1\theta + E_1 & \text{if } \theta \text{ is in region } P_1 \\ \vdots \\ C_N\theta + E_N & \text{if } \theta \text{ is in region } P_N \end{cases}$$

determined using the true data.

Some embodiments of the invention are based on a specific realization that the quantization can vary and can be determined separately and differently for data representing the one or a combination of the state of the controlled system, the regions of EMPC of the controlled system, and the gains and offsets for all regions of EMPC. For example, each region $P_i$ has a set of true gains and offsets ($C_i$, $E_i$) associated with the region, but in the actual controller implementation the true gains and offsets ($C_i$, $E_i$) are represented by their quantized representation 540, wherein the deviation between the true and the quantized gains and offsets is determined by a number of memory bits used to store the quantized gains and offsets in the controller memory.

For example, some embodiments take advantage of the realization that computing 550 the control for the region is a single operation of the following type $C\theta + E$, and hence it is computationally less complex than solving state location problem by searching for the region 530. Thus, those embodiments allocate a larger number of data bits, e.g., using binary64, to store the quantized gains and offsets 540 in the controller memory, compared to a smaller number of data bits, e.g., using binary32, to store the quantized data representing the regions. The extended number of bits for the quantized gains and offsets 540 stored in the memory 120 of the controller increases requirements of the amount of the memory 120 of the controller 110, but does not noticeably affect the on-line speed of the computation 550 of the control 504, while possibly making smaller the deviation u−ũ of the true control u 104 from the actually computed control ũ 504, which may be advantageous.

Using different precisions for (i.e. different numbers of bits to represent) different instances of data is possible because elementary arithmetic operations can be performed on numbers having different precision. For example, the scalar product of two vectors, also known as the dot "." product, is calculated by multiplying corresponding elements together and then summing the products, as in the formula $$a \cdot b = \Sigma_{i=1}^n a_i b_i,$$

describing the MAC operation, the operand vectors a and b can be given in different precisions, moreover, various individual components in any of the two vectors a and b can also be represented using different numbers of bits.

Other embodiments of the invention are based on a realization that the quantization can vary and can be determined separately and differently for data representing the regions. For example, the true data EMPC can evaluate $H_i\theta − k_i \leq 0$ for each region sequentially by taking all of the inequality matrices from each region and forming the matrix $$D \equiv \begin{bmatrix} H_1 & -k_1 \\ \vdots & \vdots \\ H_N & -k_N \end{bmatrix} = \begin{bmatrix} T_1 \\ \vdots \\ T_N \end{bmatrix},$$

while writing all the inequalities in the system as the following simple form $$D\begin{bmatrix} \theta \\ 1 \end{bmatrix} \leq 0.$$

In the memory 120 of the controller 110, every true number must be quantized, resulting, e.g., in a quantized matrix D. Various matrix entries originally given in the true precision can be quantized using different precisions, having different numbers of bits to represent the original true entries in the controller memory. Using a variety of different precisions can result in minimizing the amount of memory needed by the controller and maximizing the controller on-line speed of computation of the control without sacrificing the accuracy of the controller. As used herein, the accuracy of the controller is an inverse of one or a combination of an absolute and relative deviation of a true next state of the system determined with a true control using true data having a true precision from the next state of the system determined with the control using the data including the instances with the different precisions lower than the true precision.

A multi-precision quantization is especially advantageous when the precisions are determined by taking into account factors affecting the reduction of the accuracy of the controller due to the quantization, and balancing the reduction of the accuracy with the increasing on-line performance. For example, various elements of the state $\theta$ 103 can represent different physical quantities, such as, e.g., voltages and concentrations, being measured or estimated using different precisions, leading to the quantized state $\tilde{\theta}$ 503 having a plurality of the precisions. Therefore, it is advantageous to quantize the true data in the matrix D, resulting the quantized matrix $\tilde{D}$, also in the plurality of the precisions to optimize the accuracy and on-line performance of calculating the matrix-vector product $\tilde{D}\tilde{\theta}$.

Some embodiments of the invention are based on a realization that the maximal deviation of the state 103 of the controlled system 107 caused by that reduction of the precision of on-line execution governs the maximal reduction of the accuracy of the control 504 with quantized data with respect to the accuracy of the control 104 with true data.

Figure 6A:
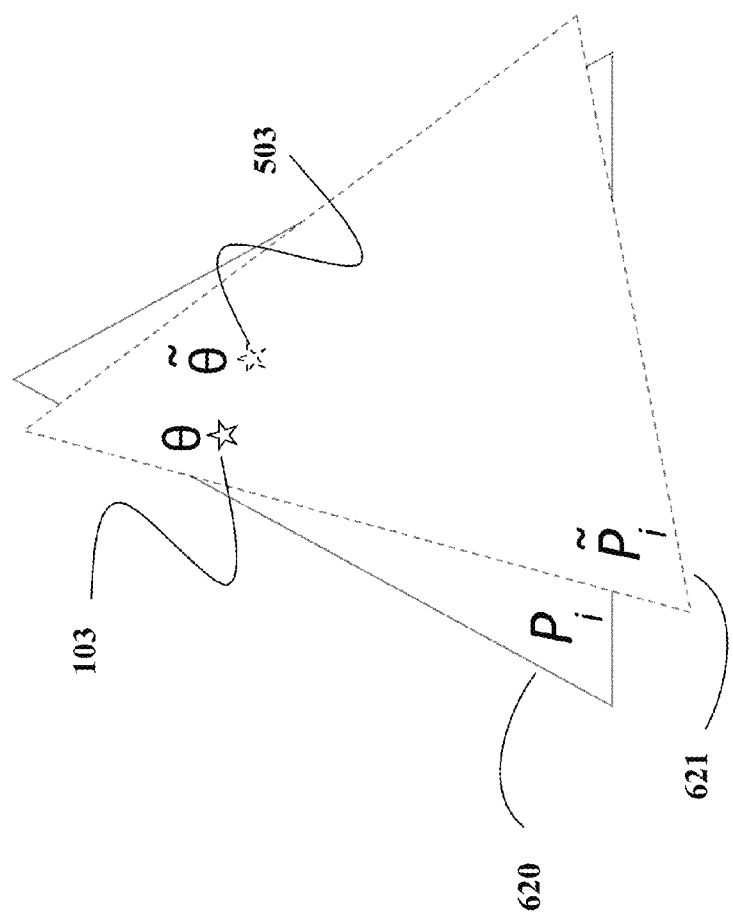
FIG. 6A is a schematic of a situation when both the true state and the quantized state are in regions with the same index according to some embodiments of the invention.

FIG. 6A shows a schematic of a situation when both the true state and the quantized state belong to regions with the same index. For example, when the true state $\theta$ 103 and the quantized state $\tilde{\theta}$ 503 are located, correspondingly, in the true region 620 and the quantized region 621 with the same index i so that the true gains and offsets ($C_i$, $E_i$) in the true region 620 are represented by their quantized representation ($\tilde{C}_i$, $\tilde{E}_i$) 540, the true control u=$C_i\theta+E_i$ 104 deviates from the actually computed control ũ=$\tilde{C}_i\tilde{\theta}+\tilde{E}_i$ 504 as $$u-\tilde{u}=C_i\theta+E_i-\tilde{C}_i\tilde{\theta}-\tilde{E}_i.$$

Assuming, for example that ($C_i$, $E_i$)=($\tilde{C}_i$, $\tilde{E}_i$), then $|u-\tilde{u}|=C_i|\theta-\tilde{\theta}|$, i.e. a ratio of the accuracy of control with quantized data and the maximal deviation of the state is bounded by a constant, in this case the constant $C_i$, that can be determined off-line, e.g., based on the specifics of the state regions for the controlled system.

Therefore, some embodiments determine off-line a mapping between various precisions of the quantized data and corresponding reductions of the accuracy of the control from the true accuracy of the control with the true data. In such a manner, different reductions in the precision can be tested, and the maximal reduction satisfying the accuracy requirement of the control can be selected.

For example, determining the accuracy of the controller as a deviation $|u-\tilde{u}|$ of a true control determined with true data having a true precision from a control determined with the data having a precision lower than the true precision, the mapping between the deviation $|\theta-\tilde{\theta}|$ of the quantized data representing the state and corresponding reductions of the accuracy of the EMPC control $|u-\tilde{u}|$ is given by the function $|u-\tilde{u}|=C_i|\theta-\tilde{\theta}|$ bounding an accuracy of the controller in FIG. 6 in the true region 620 and the quantized region 621 with the same index i, assuming that $(C_i, E_i)=(\tilde{C}_i, \tilde{E}_i)$.

Figure 6B:
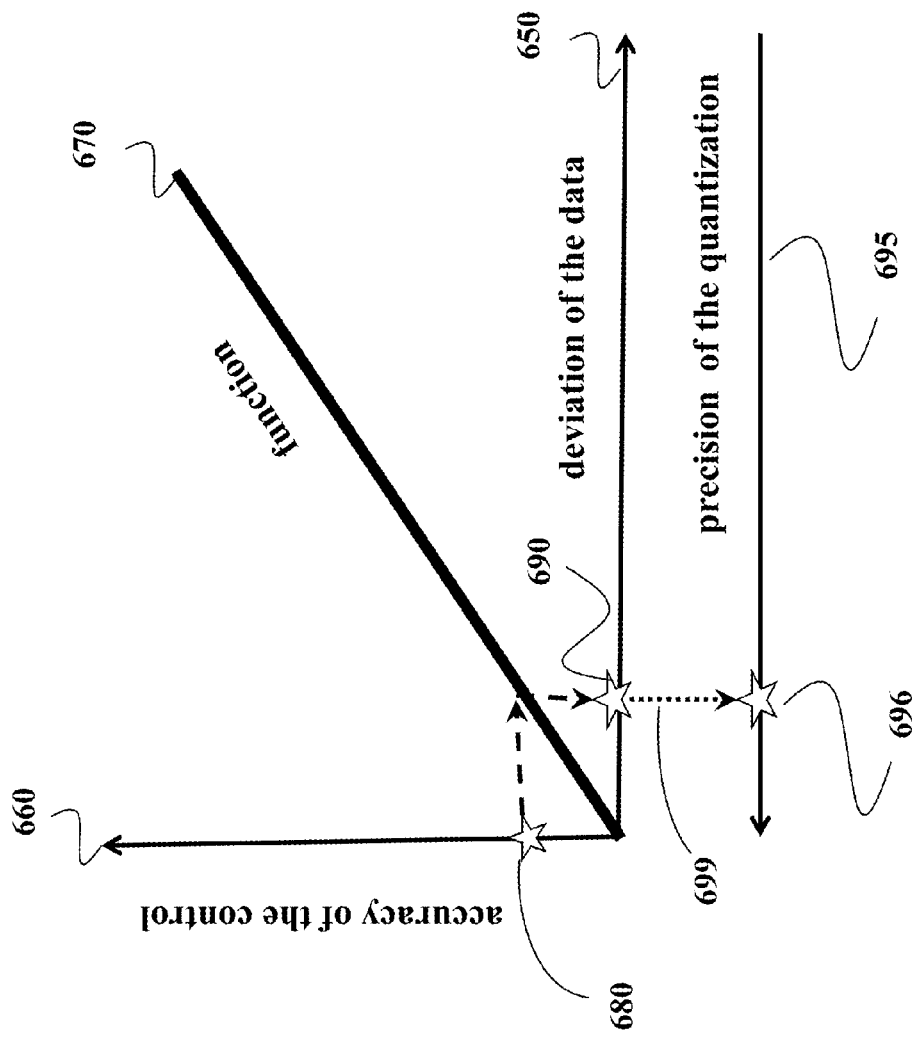
FIG. 6B is a schematic of determining from the target accuracy the required largest deviation of the data and the corresponding precision of the quantization according to some embodiments of the invention.

FIG. 6B shows a schematic of determining from the target accuracy 680 the required largest deviation of the data 690, using the function 670, in this example a line $|u-\tilde{u}|=C_i|\theta-\tilde{\theta}|$ with the slope $C_i$, bounding an accuracy of the control 660 $|u-\tilde{u}|$ by the deviation of the data 690, in this example the deviation of the state $|\theta-\tilde{\theta}|$. The target accuracy 680 is mapped into the largest allowable deviation of the data 690, which needs to be maintained during the quantization to achieve the target accuracy. Knowing the largest allowable deviation of the data 690, the required quantization precision 696 is determined using a mapping 699 of the deviation and the precision, wherein the larger precision corresponds to the smaller deviation and vice versa. For example, for the standard mapping 699, a relative deviation $10^{-8}$ approximately corresponds to the single precision 410, also called binary32. Determining the required precision of the quantization can be thus performed off-line as a part of designing the controller.

Figure 6C:
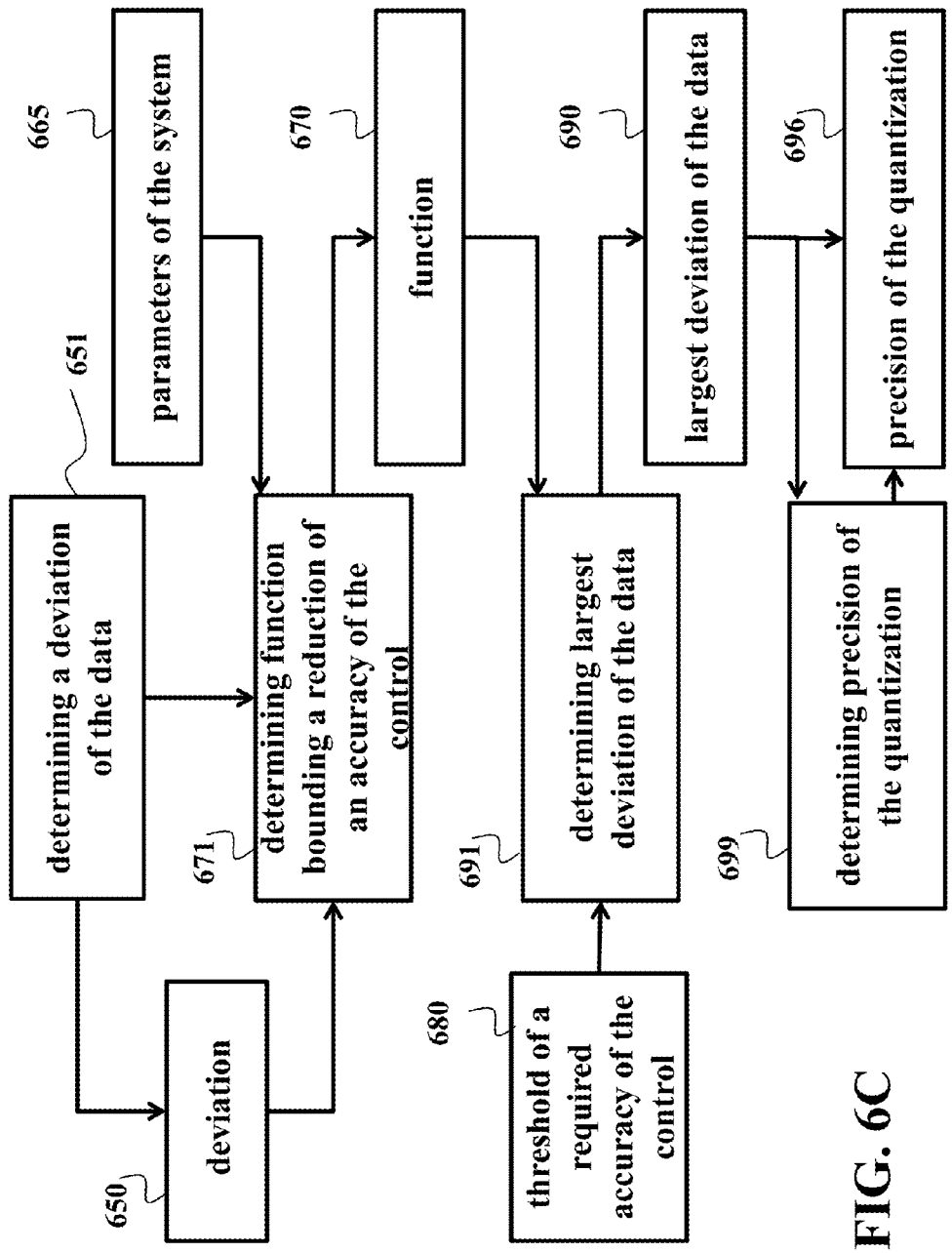
FIG. 6C is a block diagram of a method for designing EMPC controller according to some embodiments of the invention.

FIG. 6C shows a block diagram of a method, based on FIG. 6B, for designing a controller for a system. The method determines 651 a deviation 650 of a data in the controller from a true data caused by a reduction of a precision of the quantized data from a precision of the true data. The method also determines 671, using parameters of the system 665, a function 670 bounding a reduction of an accuracy of the control with the quantized data and the maximal deviation of the state.

Next, given a threshold 680 of a required accuracy of the control, the method in FIG. 6C determines 691, using the function 670, the largest allowable deviation 690 in the controller from the true data caused by the reduction of the precision of the quantized data from the true precision of the true data. Finally, the method determines 699 the precision 696 of the quantization that guarantees the largest allowable deviation 690, wherein a larger precision corresponds to a smaller deviation and vice versa. The quantized data is then determined by quantizing the true data within the determined precision, and stored in the memory of the controller.

If the precision of the state is smaller compared to the precision determined by the method in FIG. 6C, this indicates that the given threshold 680 of a required accuracy of the control may be unachievable, which indicates that the specifications of the controller are not achievable.

The method in FIG. 6C can be used to determine the precision 696 of the quantization for all or a subset of the data stored in the controller, and then reapplied again, but with the quantized data representing the parameters of the system substituting the true data representing the parameters of the system. The repeated evaluation may result in more accurate determining 671 the function 670 bounding the reduction of the accuracy of the control with the quantized data and the maximal deviation of the state.

Figure 7:
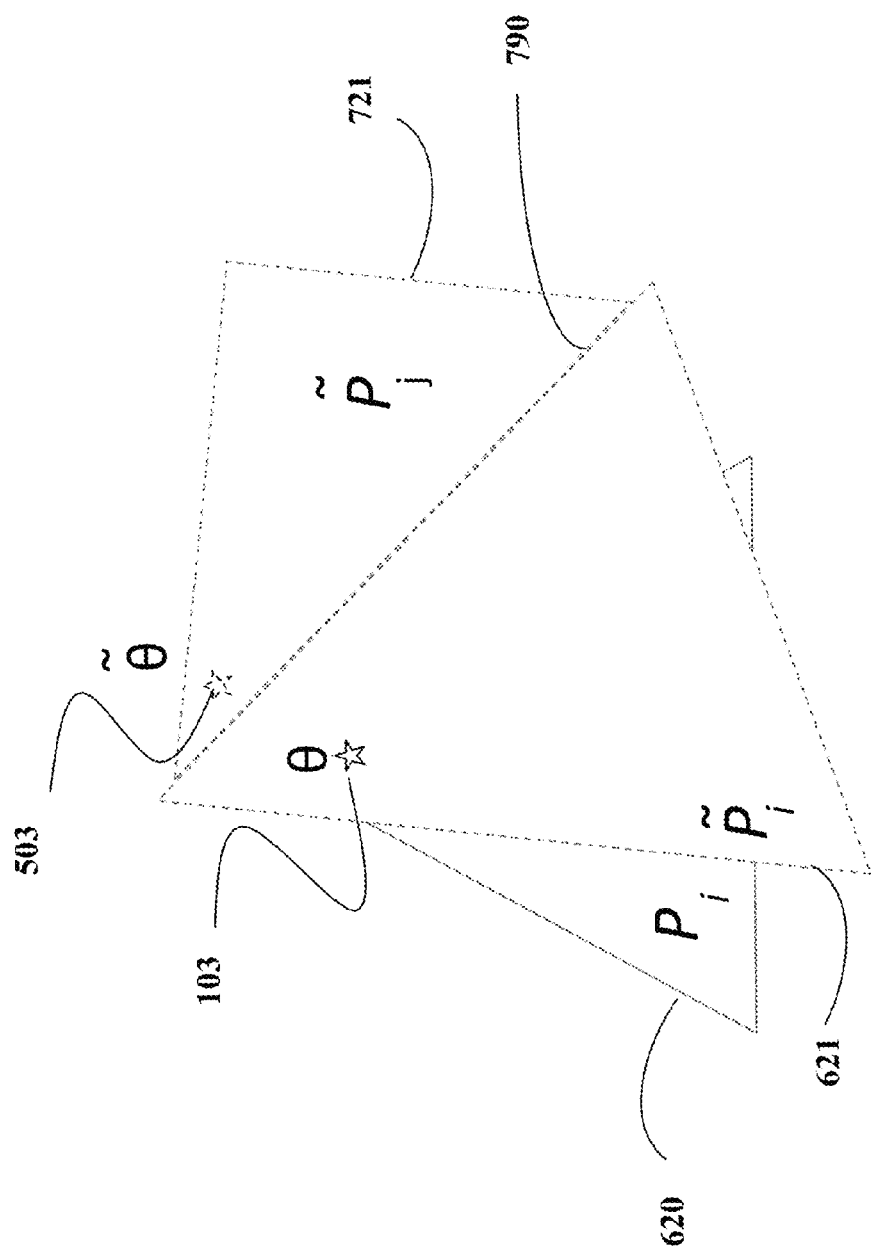
FIG. 7 is a schematic of a situation when the true state and the quantized state are in regions with the different indexes according to some embodiments of the invention.

FIG. 7 shows a schematic of a situation when the true state and the quantized state belong to regions with the different indexes. Various embodiments of the invention are based on a realization that the control error is the largest when the original true state $\theta$ 103 and the quantized state $\tilde{\theta}$ 503 belong to regions with different indexes. Such a difference between the quantized and true state can happen if, e.g., the true state vector $\theta$ 103 is in a close proximity to the facet 790 separating the two quantized regions, 621 and 721.

In this case, the true control $u=C_i\theta+E_i$ 104 can significantly deviate from the actually computed control $\tilde{u}=\tilde{C}_j\tilde{\theta}+\tilde{E}_j$ 504 because $$u-\tilde{u}=C_i\theta+E_i-\tilde{C}_j\tilde{\theta}-\tilde{E}_j,$$

wherein even assuming that $(C_j, E_j)=(\tilde{C}_j, \tilde{E}_j)$, to bound the deviation one needs to use another realization, that the true control u 104 in EMPC is a continuous function of the true state $\theta$ 103 everywhere in the state space, e.g., across the facet 790 separating the two quantized regions, 621 and 721.

Some embodiments analyze off-line every facet 790 that needs to be stored in the controller memory 120 for the given system 107 in the quantized format, and determine how many bits are needed in order to obtain the control 104 with a given level of accuracy. For example, one embodiment describes a method that first determines the worst-case scenario, i.e. the largest number of bits required over all facets, and then determines the minimal number of bits needed to quantize the data on the controller. This method is fully automatic with no tuning parameters and determines the number of bits needed for data quantization on the processor 130 in order to obtain the control 104 with a given level of accuracy, eliminating the guessing of the prior art.

Alternative embodiment determines separately the number of bits needed to quantize every individual facet 790 on the EMPC controller. This embodiment is based on a realization that different facets can require different number of bits in their quantized format to represent the same level of accuracy in the control, wherein some facets can require significantly smaller number of bits compared to the worst case. For example, if a facet requires only half bits of the controller number representation, this allows to store the data for this facet in half-precision, reducing the memory usage, and, alternatively or additionally, to perform the checking, on which side of the facet the state is, also in half-precision. Half-precision calculations can be implemented to run twice faster, compared to the normal clock rate of the controller processor, speeding up the most computationally expensive part of the controller operation, and thus increasing the EMPC controller performance and speed.

Figure 8:
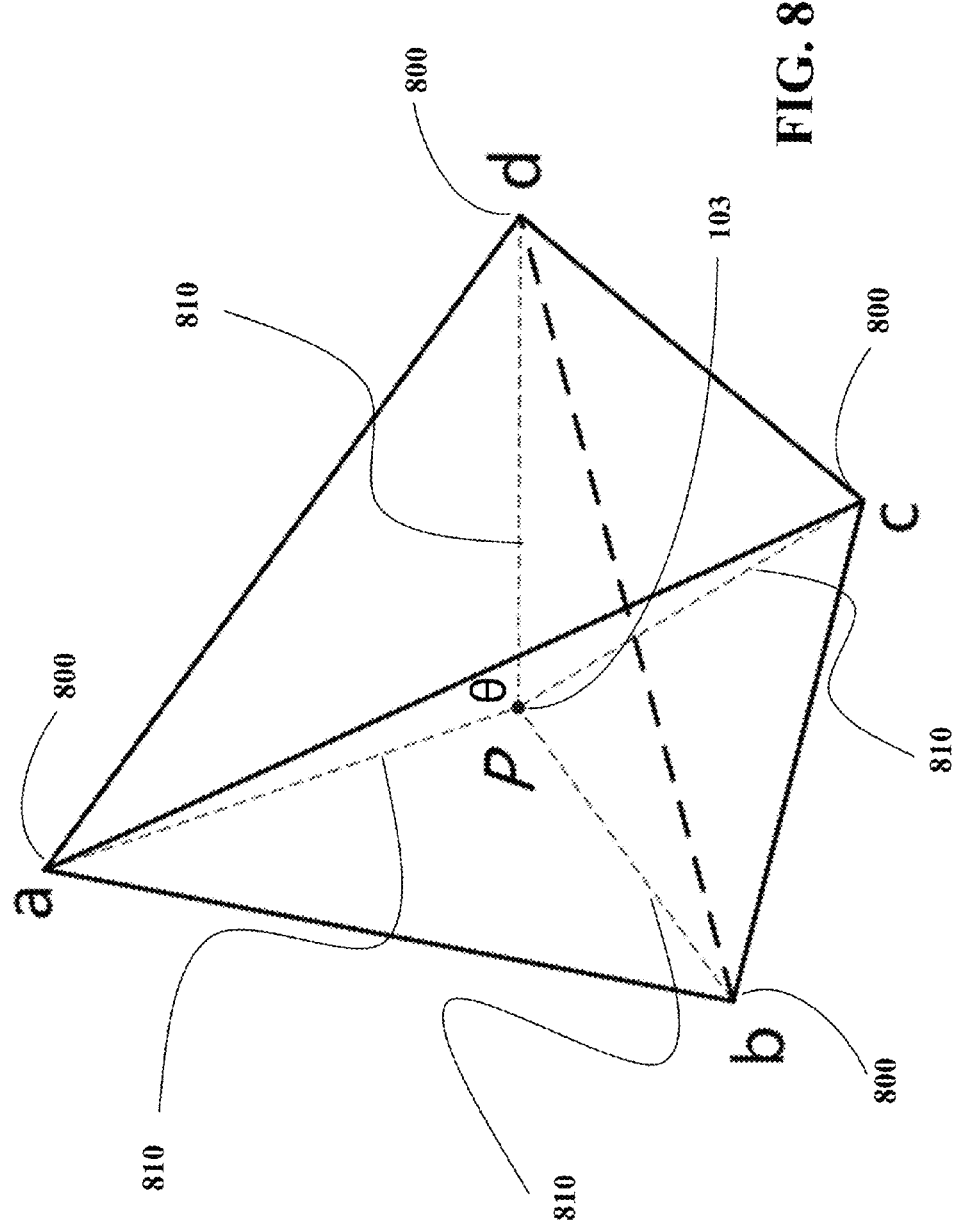
FIG. 8 is a schematic of determining barycentric coordinates of the state in a polyhedral region in three dimensions according to some embodiments of the invention.

FIG. 8 shows an example of determining barycentric coordinates of the state in a polyhedral region in three dimensions according to some embodiments of the invention. Those embodiments are based on a realization that EMPC regions can be represented in various ways, not necessarily using the facets separating the regions. For example, the data representing in EMPC the region P can be determined based on vertices 800 of the region, wherein an algorithm for the region search 530 is based on barycentric coordinates 810 of the state $\theta$ 103 with respect to every region. FIG. 8 illustrates an example of the tetrahedral region P with four vertices a, b, c, and d 800 in three dimensions. The use of the barycentric coordinates 810 is advantageous, because the vertex-based representation of regions in the data is more accurate, compared to the facet-based representations, thus decreasing the numbers of bits for storage in the memory 120 of the EMPC controller 110 and increasing the on-line performance of the controller 110, compared to the prior art.

Figure 9A:
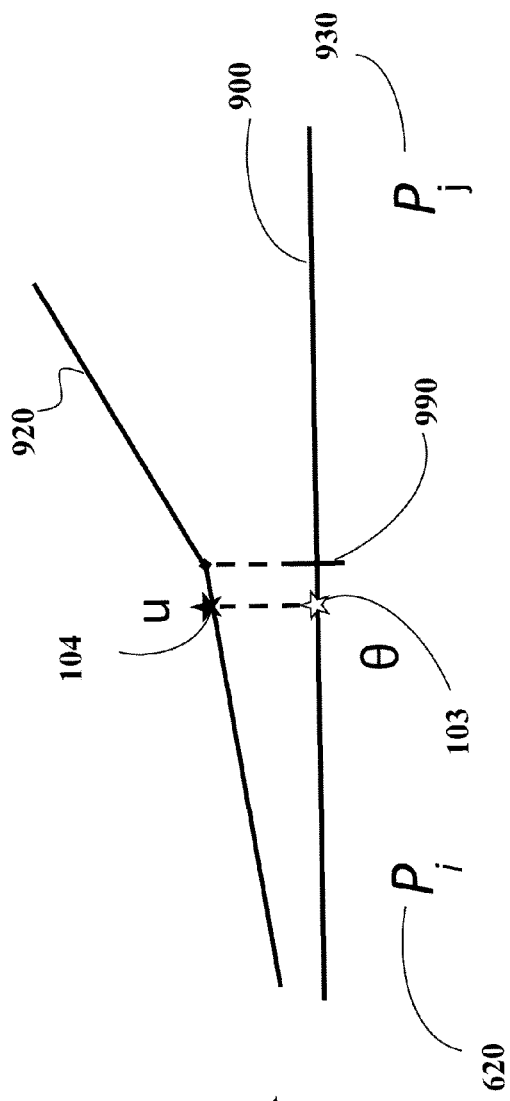
FIGS. 9A and 9B show schematics of exemplar embodiments determining which data are stored in the memory with different precisions according to some embodiments of the invention.
Figure 9B:
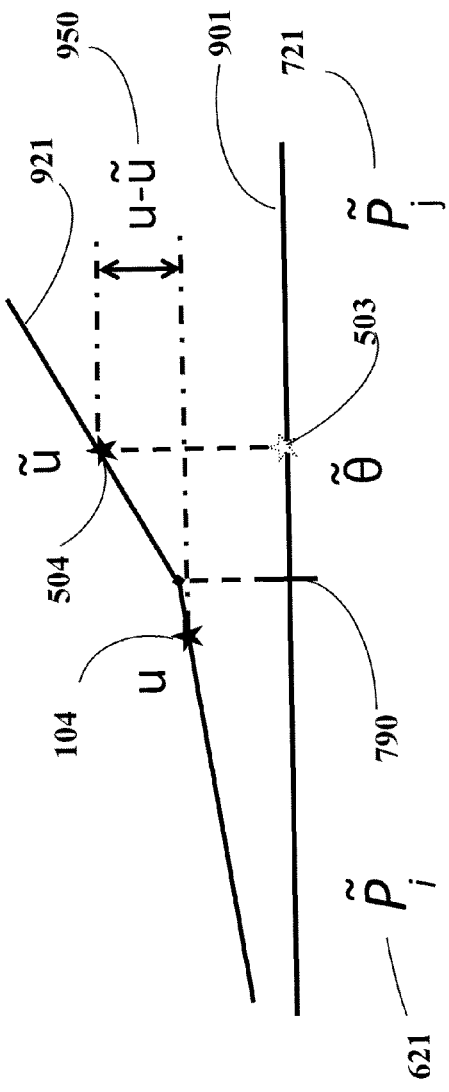

FIGS. 9A and 9B show schematics of exemplar embodiments determining where the data are stored in the memory 120 with the different precisions, wherein the instances of the data greater affecting the accuracy of the controller are stored with a larger precision, compared to the instances of the data less affecting the accuracy of the controller 110. For example, some embodiments determines the small precision of the data in EMPC representing the facet that separates the two regions with gains, which are small or nearly equal, because even if the state jumps across the facet from the one region to the other due to quantization of the system state and the facet, there is only a small loss of accuracy of the control 104.

FIG. 9A shows an example of a one dimensional true state space 900, separated by a true facet 990 into two true regions 620 and 930, in this example intervals, wherein the true state $\theta$ 103 results in the true control $u = C_i \theta + E_i$ 104 in EMPC, which belongs to a one dimensional true control space 900. As a result of quantization, the data represented in FIG. 9A turn into the corresponding data represented in FIG. 9B, which shows a one dimensional quantized state space 901, separated by a quantized facet 790 into two quantized regions 621 and 721, in this example intervals, wherein the quantized state $\tilde{\theta}$ 503 results in the actually computed control $\tilde{u} = \tilde{C}_j \tilde{\theta} + \tilde{E}_j$ 504, which belongs to a one dimensional quantized control space 901. In this example, all true gains and offsets ($C_i$, $E_i$) and ($C_j$, $E_j$) are scalars, as well as their quantized analogs ($\tilde{C}_i$, $\tilde{E}_i$) and ($\tilde{C}_j$, $\tilde{E}_j$).

The deviation 950 in the control $u - \tilde{u} = C_i \theta + E_i - \tilde{C}_j \tilde{\theta} - \tilde{E}_j$ due to the quantization, resulting in this example in the jump the state 103 into the quantized state 503 over the facet 790 into the wrong region 721, would be small if the gains $C_i$ and $C_j$, representing the control line slopes in FIG. 9A in the into two true regions 620 and 930, were small or nearly the same. This realization is used by some embodiments to quantize the facet 990 using a smaller precision, if the facet separates the regions with small or nearly the same gains.

Some embodiments are based on a realization that the large deviation 950 in the control by itself can still give an accurate controller, because a more important quantity, compared to the deviation in the control, can be a deviation in the state at the next time step due to the quantization. For example, for the linear system 107, the deviation in the state at the next time step x(t+1) resulting from the deviation in the control $u - \tilde{u}$ is equal to $B(u - \tilde{u})$, which thus can be viewed as a quantity better describing the accuracy of the controller, compared to just $u - \tilde{u}$.

Figure 10:
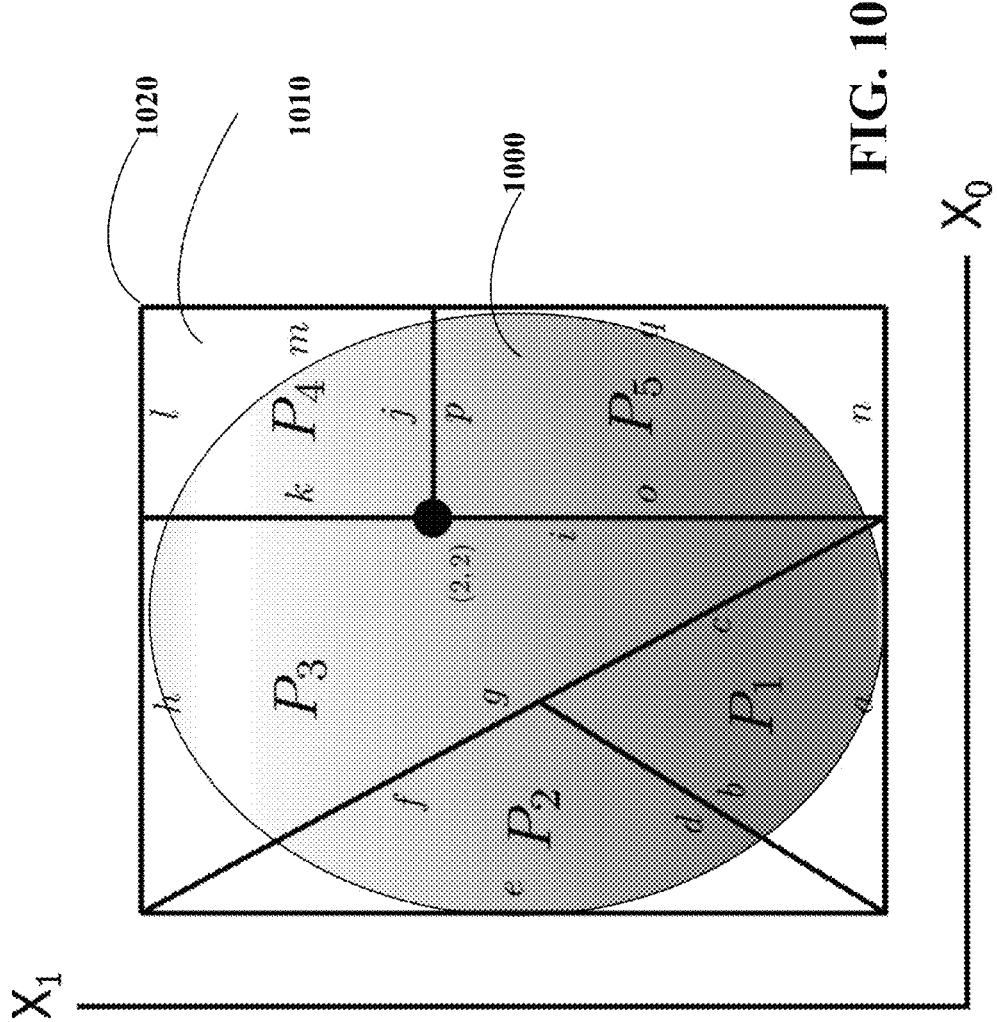
FIG. 10 is an example of a predetermined probability distribution of the current state used by some embodiments of the invention.

FIG. 10 shows a predetermined probability distribution of the current state 103 randomly distributed in the state space and used by some embodiments of the invention. Those embodiments are based on a realization that the state vector for many practical systems does not necessarily fill the whole state space, instead following some trajectories, which occupy only a small subset of the state space. A prior knowledge of the subset of the state space, possibly containing the state vector, or a probability distribution of the state vector randomly distributed over the state space, allows one to store with high precision only the data related to the subset of the state space, where the state vector is more likely to be.

For example, the state 103 of the system 107 can have some probabilistic nature, e.g., can be randomly distributed in the state space using a predetermined probability distribution 1000, wherein the current state of the EMPC system is randomly distributed in an ellipsoid 1010 in the state space 1020, and wherein a darker region indicates a high probability of the state to be, in FIG. 10. The probabilistic nature allows one to determine a probabilistic concept of the accuracy of the controller based on, for example, an averaged deviation, or the accuracy guaranteed with a certain probability. The probabilistic concept of the accuracy introduces several new considerations for determining the precision of the quantization. For example, some embodiments quantize those regions or facets with higher precision that are more likely to appear in the region search for the given distribution of the state, i.e., the regions with the largest volumes and the facets with the largest surfaces, relative to the given distribution of the state.

In FIG. 10, for example, if the distribution of the state were uniform, the state is most likely to be in the region $P_3$, with the largest volume. But due to the fact that the actual given distribution 1000 has high probability density, e.g., at the bottom of the ellipsoid 1010, regions $P_1$ and $P_5$ are also likely to contain the state, and thus, should be quantized using a higher precision. In terms of the facets in FIG. 10, facets g and i are the two longest, and d/b is shorter, but is located in a high probability density area, thus, some embodiments can quantize those facets using a higher precision, compared to that for the facet j/p that is both shorter and located in a low probability density region.

In other embodiments, the processor 130 of the controller 110 determines and updates data in the memory 120 with different precisions during an operation of the system 107, for example, using learning of possible positions the state vector in the state space to determine the subset of the state space, possibly containing the state vector, or the probability distribution of the state vector randomly distributed over the state space, if not known a priory. The learning of the possible positions the state vector in the state space can be combined with some initially predetermined information, for example, to update and improve an a priori given approximate subset of the state space, possibly containing the state vector.

Digital Circuit Architecture

It is a further object of some embodiments of the invention to design a general digital circuit that can be applied to a wide range of EMPC problem sizes and target devices. To this end, the number of MAC units used in any particular implementation of a controller can be selected such that the resulting circuit meets some design goal. Often the design goal is that the resulting circuit does not use more MAC units than are available in a particular FPGA or can fit on a particular ASIC. However, other design goals, such as power consumption or cost, can also be considered.

Figure 11:
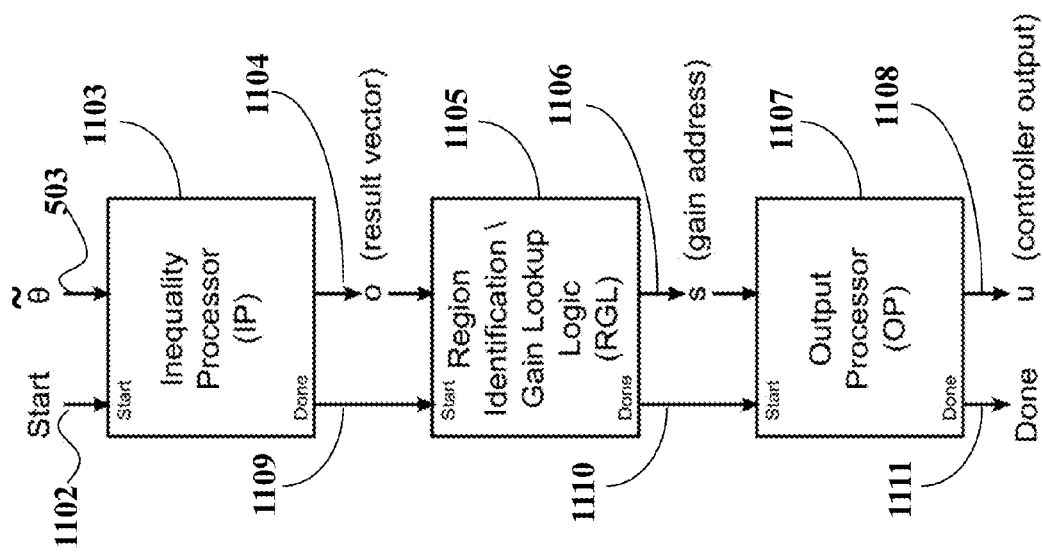
FIG. 11 is a block diagram of a circuit for the EMPC controller according to some embodiments of the invention.

FIG. 11 is a block diagram of the circuit of the controller according to some embodiments of the invention. When the quantized state $\tilde{\theta}$ 503 is updated at one or a combination of the state sensor or the state estimator, the controller start signal 1102 is asserted to indicate the beginning of the processing. An inequality processing (IP) unit 1103 evaluates all of the inequalities in the system and produces a set of Boolean results, e.g., a vector o 1104, which has one element for each inequality in the system. A zero in a particular position of the set indicates that the corresponding inequality is false, and a one indicates that the corresponding inequality is true. The data, representing the inequalities in the system in the IP unit 1103 are quantized according to embodiments of the invention.

A region identification and gain lookup logic (RGL) unit 1105 processes the set of Boolean results to determine the operating region of the controller. Based on the active region, the RGL unit generates a gain address signal s 1106. The output processing (OP) unit 1107 uses the gain address signal to select the correct gain coefficients for use in calculating the controller output u 0708. The gain and offset coefficients are quantized according to embodiments of the invention. Intermediate start signals 1109 and 1110 control the flow of data between the IP, RGL, and OP units. The done signal 1111 indicates that the controller has finished the output calculation and the controller output can be sent to the system. The quantization precision can vary in different units. For example, it can be beneficial to store the gain and offset coefficients in the higher precision in the OP, compared to the precision of the data representing the inequalities in the IP.

Figure 12:
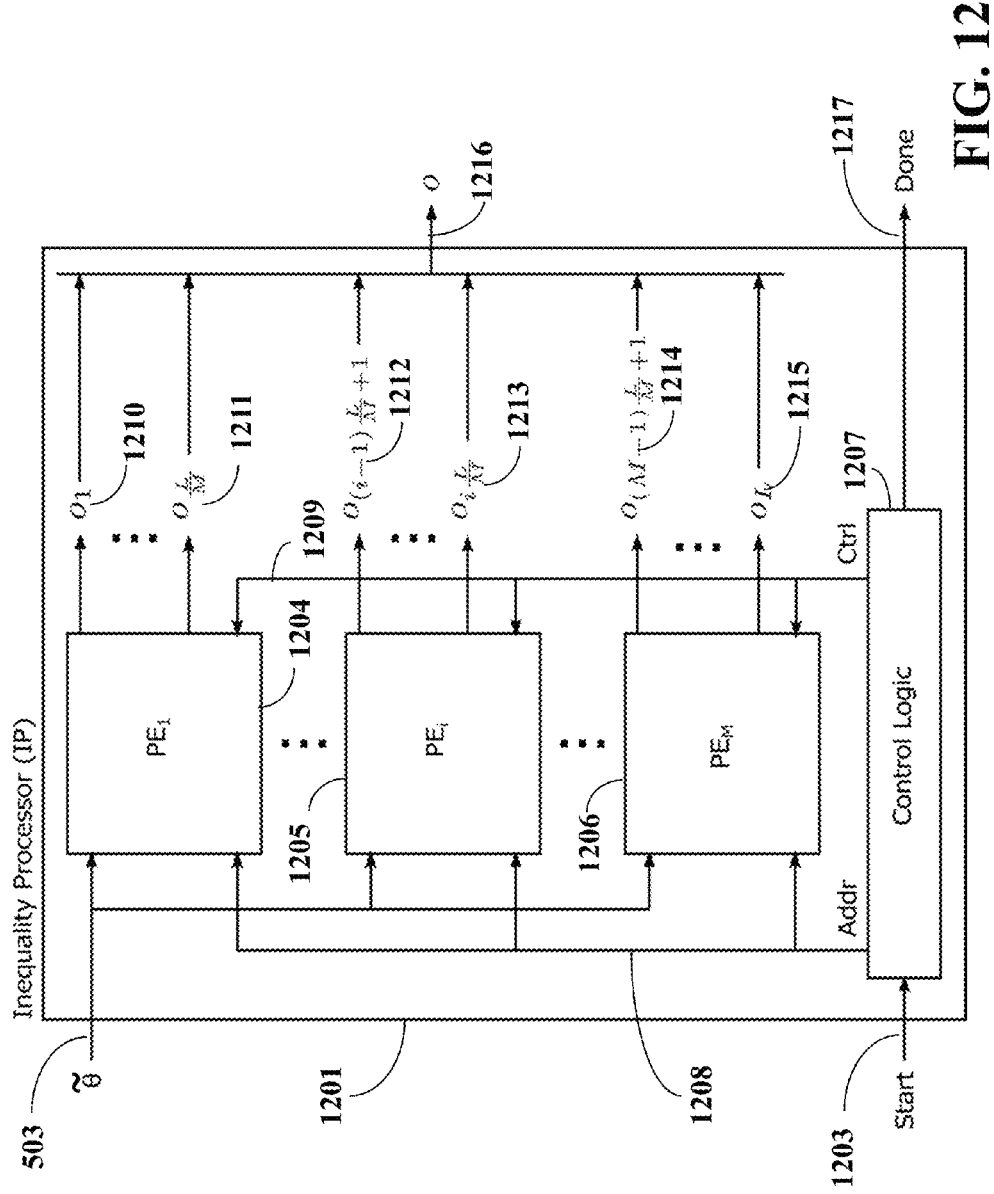
FIG. 12 is a block diagram of the inequality processing unit for the EMPC controller according to some embodiments of the invention.

FIG. 12 shows details of the IP module 1201. The inputs to the IP are the quantized state $\tilde{\theta}$ 503 and the start signal 1203. The IP is composed of M Processing Elements (PEs) where M is an integer that is greater than or equal to one. The first processing element in the system is $PE_1$ 1204, intermediate processing elements are $PE_i$ 1205, and the last processing element is $PE_M$ 1206. Different PEs can use a plurality of the precisions, for example binary16 and binary32, determined according to embodiments of the invention.

One embodiment is based on a realization that the quantized data representing the inequalities for facets in EMPC can be clustered according to the precisions of the quantization into a plurality of clusters, and then distributed between different PEs, matching the precision of the data and the precision of the PE.

The IP can also contain a control logic unit 1207 that generates an address signal 1208 and a set of control signals 1209 to control the operation of the PEs in the IP. The control logic unit can also allocate subsets of inequalities among different PEs. For example, for a controller that includes L inequalities, the inequalities are allocated among the PEs such that each PE processes $$\frac{L}{M}$$

inequalities. Each PE generates one output for each inequality that the PE processes. For example, a $PE_1$ generates output signals $o_1$ 1210 through $O_{L/M}$ 1211, intermediate Pes, $PE_i$, generate output signals $o_{(i-1)L/M+1}$ 1212 through $o_{iL/M}$ 1213, and the last PE, $PE_M$, generates output signals $o_{(M-1)L/M+1}$ 1214 through $o_L$ 1215. Each individual output signal is then aggregated into the output vector o 1216 which has L elements. When the processing operation is complete the control logic asserts the done signal 1217.

Figure 13:
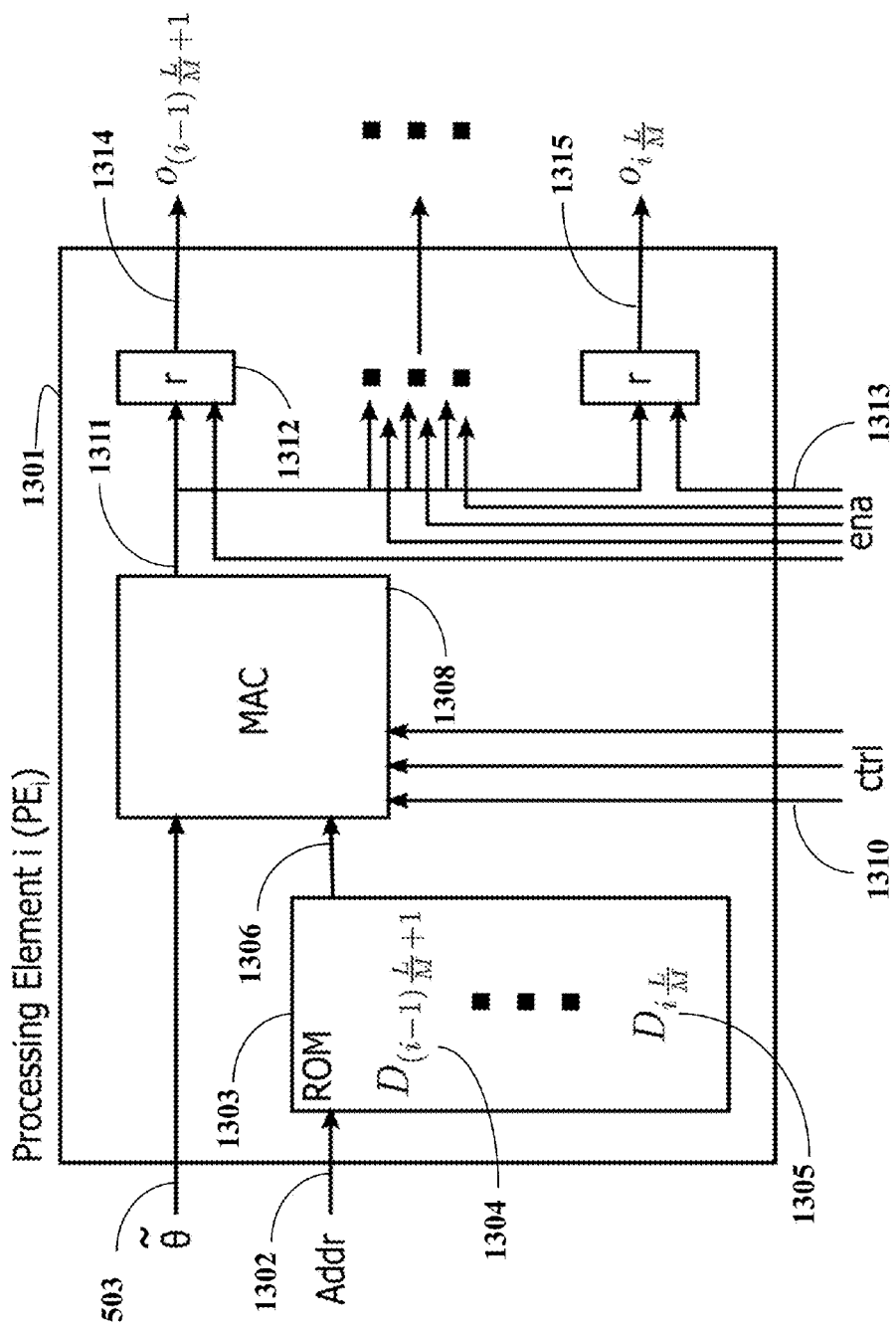
FIG. 13 is a block diagram of a processing element (PE) of the inequality processing unit for the EMPC controller according to some embodiments of the invention.

FIG. 13 is a block diagram of the $i^{th}$ processing element, $PE_i$ 1301. The Addr signal 1302 is used to lookup inequality coefficients in the memory, e.g., read only memory (ROM) 1303. The ROM includes L/M inequalities, where L is the number of inequalities in the controller, and M is the number of PEs in the controller. If D is a matrix with L rows comprising all the inequalities in the controller, the ROM of $PE_i$ includes a subset of D having rows $D_{(i-1)L/M+1}$ 1304 to $D_{iL/M}$ 1305. The ROM output 1306 and the quantized state $\tilde{\theta}$ 503 enter the multiply accumulate unit (MAC) 1308 to be multiplied together and added to a running sum that is stored inside the MAC unit. The ROM output 1306 and the augmented system quantized state vector $\tilde{\theta}$ 503 can be quantized using a plurality of precisions, determined according to embodiments of the invention. The MAC unit can handle quantized inputs with different precisions. The MAC unit can also internally use own extended, i.e. higher, MAC unit precision, e.g., used exclusively for the accumulated running sum that is stored inside the MAC unit. A plurality of control signals 1310 determines the sequence of operations performed inside the MAC unit. When all of the coefficients representing a single inequality have been multiplied by the elements of the state and accumulated, the result is a single bit that indicates whether the inequality is true or false. That single bit signal forms the output of the MAC unit 1311. For each inequality there is an output register r 1312 that stores the MAC output. The L/M enable signals 1313 control when each output register stores the value of the MAC output signal, such that output of each register represents the result of evaluating the corresponding inequality from the ROM. As such, the first output $o_{(i-1)L/M+1}$ 1314 is the result of evaluating the first inequality in the ROM 1304 and the last output $o_{iL/M}$ 1315 is the result of evaluating the last inequality in the ROM 1305.

One embodiment is based on a realization that the quantized data representing the inequalities for facets can have a plurality of the precisions of the quantization, stored in the PE ROM 1303. It can be beneficial if the data are ordered in the PE ROM 1303 such that inequalities represented in the smaller precision are evaluated first, compared to the inequalities represented in the higher precision, which are evaluated last, possibly increasing an average on-line speed of the controller.

Figure 14:
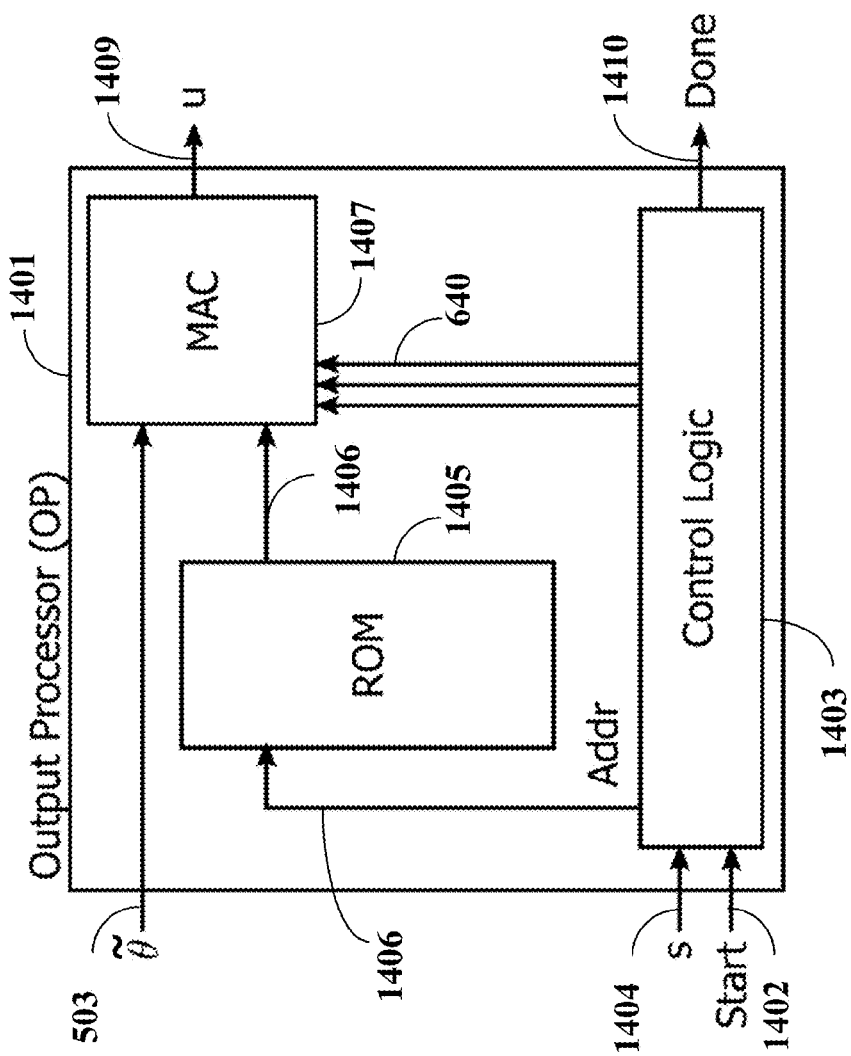
FIG. 14 is a block diagram of an output processing unit for the EMPC controller according to some embodiments of the invention.

FIG. 14 is a block diagram of the OP 1401. The Start signal 1402 initiates the controller output calculation. The control logic 1403 uses the gain address vector s 1404 as a pointer into the ROM 1405 indicating where the correct gain coefficients are stored. Using s as a starting address the control logic generates an address signal 1406 which increments to address each gain coefficient as it is needed in the calculation. The MAC unit 1407 multiplies elements of the quantized state vector $\tilde{\theta}$ 503 with the gain coefficients 1406 from the ROM 1405 and adds them to a running sum. The ROM output 1406 and the quantized state vector $\tilde{\theta}$ 503 can be quantized using a plurality of precisions, determined according to embodiments of the invention. The OP MAC unit 1407 can handle quantized inputs with different precisions. The OP MAC 1407 unit can also internally use own extended, i.e. higher, MAC unit precision, e.g., used exclusively for the accumulated running sum that is stored inside the OP MAC unit 1407. The precision of OT MAC unit 1308 and the precision of OP MAC unit 1407 can be determined independently and differently, according to embodiments of the invention. At the end of this process the actual controller output 1409 is generated and the signal 1410 is set to one.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers, for example, in a computer cloud. Such processors can be implemented as integrated circuits, with one or more processors in an integrated circuit component. Though, a processor can be implemented using circuitry in any suitable format.

Further, it should be appreciated that a computer can be embodied in any of a number of forms, such as a rack-mounted computer, a desktop computer, a laptop computer, minicomputer, or a tablet computer. Such computers can be interconnected by one or more networks in any suitable form, including as a local area network or a wide area network, such as an enterprise network or the Internet. Such networks can be based on any suitable technology and can operate according to any suitable protocol and can include, for example, wireless networks, wired networks or fiber optic networks.

Also, the various methods or processes outlined herein can be coded as software that is executable on one or more processors that employ any one of a variety of operating systems or platforms. Additionally, such software can be written using any of a number of suitable programming languages and/or programming or scripting tools.

Also, the embodiments of the invention can be embodied as a method, of which an example has been provided. The steps performed as part of the method can be ordered in any suitable way. Accordingly, embodiments can be constructed in which acts are performed in an order different than illustrated, which can include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for controlling a system, comprising:
a non-transitory computer-readable memory storing data for an operation and a control of the system, wherein at least two instances of the data are stored in the memory with different precisions, wherein the precision of the instance is defined by a number of bits storing the instance in the memory; and
at least one processor operatively connected to the memory for determining, in response to receiving a current state of the system, a control signal transitioning a state of the system from the current state to a next state using the instances of the data with the different precisions, and for controlling the system to transition the state of the system from the current state to the next state using the control signal,
wherein the different precisions are determined such that an accuracy of the controller is greater than a target accuracy of the controller, wherein the accuracy of the controller is an inverse of one or a combination of an absolute and relative deviation of a true next state of the system determined with a true control using true data having a true precision from the next state of the system determined with the control using the data including the instances with the different precisions lower than the true precision.

2. The controller of claim 1, wherein the control of the system is a model predictive control (MPC), such that the controller determines the next state of the system using a model of the system, wherein the data includes the current state of the system, parameters of the model of the system, and parameters of the control.

3. The controller of claim 2, further comprising of one or a combination of:

a sensor for sensing the current state of the system, wherein an accuracy of the sensor defines the target accuracy of the controller;
an estimator for estimating the current state of the system, wherein an accuracy of the estimator defines the target accuracy of the controller.

4. The controller of claim 1, wherein the control of the system is an explicit model predictive control (EMPC), wherein the data includes parameters of facets partitioning a state space of the system into a set of convex state regions and parameters of the control for each state region, wherein the processor determines the control signal using the parameters of the control for a state region including the current state of the system, and wherein the instances of the data with the different precisions include at least one of the parameters of the facets and the parameters of the control for various state regions.

5. The controller of claim 4, wherein the parameters of the control include a gain and an offset of the control for each state region, wherein the data includes a first gain and a first offset of the control for a first state region quantized with a first precision, and includes a second gain and a second offset of the control for a second state region quantized with a second precision, and wherein the first and the second precisions are such that a first accuracy of the controller with the current state of the system in the first region substantially equals a second accuracy of the controller with the current state of the system in the second region.

6. The controller of claim 4, wherein the parameters of the facets include a parameter for a first facet quantized with a first precision and a parameter for a second facet quantized with a second precision, wherein the first and the second precisions are lower than a true precision, and wherein the first precision is different than the second precision.

7. The controller of claim 6, wherein the first facet boarders at least a first state region and the second facet boarders at least a second region, and wherein the first precision and the second precision are such that a first accuracy of the controller with the state of the system in the first region substantially equals a second accuracy of the controller with the state of the system in the second region.

8. The controller of claim 7, wherein the first accuracy of the controller is an inverse of deviations of values of a first next state of the system determined by the controller from a true first next state at a first point of a maximal deviation of a first current state of the system from the first facet such that a quantized current state remains in the quantized first region bordered by the first facet quantized with the first precision, and wherein the second accuracy of the controller is an inverse of the deviations of values of a second next state of the system determined by the controller from a second true next state at a second point of a maximal deviation of the second current state of the system from the second facet such that the quantized current state remains in the quantized second region bordered by the second facet quantized with the second precision.

9. The controller of claim 1, wherein the different precisions of the instances of the data during the operation of the system are determined using one or a combination of a known probability distribution of the current state in the state space and subset of the state space that is more likely to include the current state of the system than the rest of the state space, and wherein the precision for the instances of the data for subset of the state space is greater than the precision for the instances of the data for the rest of the state space.

10. The controller of claim 6, wherein the first precision and the second precision are such that a first accuracy of the controller with the state of the system in a first vicinity of the first facet substantially equals a second accuracy of the controller with the state of the system in a second vicinity of the second facet, wherein the vicinity of the facet is a largest set of the state space such that the current state of the system in the set is on the opposite side from the facet compared to the quantized current state from the quantized facet.

11. The controller of claim 6, wherein the first precision is greater than the second precision and the data are ordered in the memory such that the second facet is evaluated with respect to the current state before the first facet.

12. The controller of claim 6, wherein the facets are clustered in the memory according to values of the different precisions into a plurality of clusters, further comprising:
a plurality of processors connected to corresponding clusters for evaluating concurrently facets from different clusters.

13. The controller of claim 1, wherein the processor determines and updates the different precisions of the instances of the data during an operation of the system.

14. A method for controlling a system, comprising:
determining, in response to receiving a current state of the system, a control signal transitioning a state of the system from the current state to a next state using the data representing an operation and a control of the system, wherein at least two instances of the data are quantized with different precisions, wherein the precision of the instance is defined by a number of bits required to store the instance in a memory, wherein the different precisions are determined according to a function bounding an accuracy of the controller for the different precisions of the instances of the data, wherein the accuracy of the controller is an inverse of a deviation of a true control determined with true data having a true precision from a control determined with the data having a precision lower than the true precision; and
controlling the system to transition the state of the system from the current state to the next state using the control signal, wherein steps of the method are performed by at least one processor of a controller.

15. The method of claim 14, wherein the control of the system is a model predictive control (MPC), such that the controller determines the next state of the system using a model of the system, wherein the data includes the current state of the system, parameters of the model of the system, and parameters of the control, wherein the different precisions are determined such that an accuracy of the controller is greater than a target accuracy of the controller, wherein the accuracy of the controller is an inverse of one or a combination of an absolute and relative deviation of a true next state of the system determined with a true control using true data having a true precision from the next state of the system determined with the control using the data including the instances with the different precisions lower than the true precision.

16. The method of claim 14, wherein the control of the system is an explicit model predictive control (EMPC), wherein the data includes parameters of facets partitioning a state space of the system into a set of convex state regions and parameters of the control for each state region, wherein the processor determines the control signal using the parameters of the control for a state region including the current state of the system, and wherein the instances of the data with the different precisions includes at least one of the parameters of the facets and the parameters of different state regions, wherein the parameters of the control include a gain and an offset of the control for each state region, wherein the parameters of the facets include the parameters of a first facet quantized with a first precision and the parameters of a second facet quantized with a second precision, wherein the first and the second precisions are lower than a true precision, and wherein the first precision is different than the second precision, wherein the first facet boarders at least a first state region and the second facet boarders at least a second region, and wherein the first precision and the second precision are such that a first accuracy of the controller with the state of the system in the first region substantially equals a second accuracy of the controller with the state of the system in the second region.

17. A method for controlling a system using a controller determining a control signal transitioning a state of the system from a current state to a next state, comprising:
determining, using data representing an operation and a control of the system, a function bounding an accuracy of the controller for different precisions of instances of the data, wherein the accuracy of the controller is an inverse of a deviation of a true control determined with true data having a true precision from a control determined with the data having a precision lower than the true precision, and wherein the precision of the instance is defined by a number of bits required to store the instance in a memory;
selecting, using the function, a precision for different instances of the data, such that the selected precision results in at least a target accuracy of controller controlling the system with the different instances of the data;
storing the data quantized with the selected precision in a memory of the controller;
determining, in response to receiving the current state of the system, the control signal transitioning the state of the system from the current state to the next state using the different instances of the data; and
controlling the system to transition the state of the system from the current state to the next state using the control signal, wherein steps of the method are performed by at least one processor.

18. The method of claim 17, wherein the control of the system is an explicit model predictive control (EMPC), wherein the data includes parameters of facets partitioning a state space of the system into a set of convex state regions and parameters of the control for each state region, wherein the processor determines the control signal using the parameters of the control for a state region including the current state of the system, and wherein the instances of the data with the different precisions includes at least one of the parameters of the facets and the parameters of different state regions, wherein the parameters of the control include a gain and an offset of the control for each state region, wherein the parameters of the facets include the parameters of a first facet quantized with a first precision and the parameters of a second facet quantized with a second precision, wherein the first and the second precisions are lower than a true precision, and wherein the first precision is different than the second precision, wherein the first facet boarders at least a first state region and the second facet boarders at least a second region, and wherein the first precision and the second precision are such that a first accuracy of the controller with the state of the system in the first region substantially equals a second accuracy of the controller with the state of the system in the second region.

19. The method of claim 18, further comprising:
determining, using maximal or average deviations of a state of the system crossing each facet of each state region, a set of functions strictly or probabilistically bounding the accuracy of the controller for the different precisions of the instances of the data representing facets of the state regions;

iteratively updating the set of functions bounding the accuracy of the controller using the previously the quantized data; and selecting the function from the set of function resulting in the lowest precision for the target accuracy of the controller.

20. A controller for controlling a system, comprising:

a non-transitory computer-readable memory storing data for an operation and a control of the system, wherein at least two instances of the data are stored in the memory with different precisions, wherein the precision of the instance is defined by a number of bits storing the instance in the memory; and at least one processor operatively connected to the memory for determining, in response to receiving a current state of the system, a control signal transitioning a state of the system from the current state to a next state using the instances of the data with the different precisions, and for controlling the system to transition the state of the system from the current state to the next state using the control signal, wherein the control of the system is a model predictive control (MPC), such that the controller determines the next state of the system using a model of the system, wherein the data includes the current state of the system, parameters of the model of the system, and parameters of the control.

21. A controller for controlling a system, comprising:

a non-transitory computer-readable memory storing data for an operation and a control of the system, wherein at least two instances of the data are stored in the memory with different precisions, wherein the precision of the instance is defined by a number of bits storing the instance in the memory; and at least one processor operatively connected to the memory for determining, in response to receiving a current state of the system, a control signal transitioning a state of the system from the current state to a next state using the instances of the data with the different precisions, and for controlling the system to transition the state of the system from the current state to the next state using the control signal, wherein the control of the system is an explicit model predictive control (EMPC), wherein the data includes parameters of facets partitioning a state space of the system into a set of convex state regions and parameters of the control for each state region, wherein the processor determines the control signal using the parameters of the control for a state region including the current state of the system, and wherein the instances of the data with the different precisions include at least one of the parameters of the facets and the parameters of the control for various state regions.

* * * * *